(12) United States Patent
Kinme et al.

(10) Patent No.: US 6,708,796 B2
(45) Date of Patent: Mar. 23, 2004

(54) ELECTRIC POWER STEERING APPARATUS

(75) Inventors: Shigetaka Kinme, Kashiwara (JP); Tatsuhiro Yamamoto, Yamatokooriyama (JP); Susumu Imagaki, Tondabayashi (JP); Osamu Sano, Kashihara (JP); Kunihiro Oka, Kashihara (JP); Tomoyuki Takei, Kashiwara (JP); Masanori Kobayashi, Nara (JP); Yoshio Ito, Tondabayashi (JP); Tatsuo Otsuka, Tondabayashi (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/863,102

(22) Filed: May 18, 2001

(65) Prior Publication Data

US 2002/0017420 A1 Feb. 14, 2002

(30) Foreign Application Priority Data

| May 18, 2000 | (JP) | 2000-147046 |
| Jul. 4, 2000 | (JP) | 2000-202889 |
| Jul. 6, 2000 | (JP) | 2000-205752 |
| Jul. 19, 2000 | (JP) | 2000-219368 |

(51) Int. Cl.[7] ............................................. B62D 5/04
(52) U.S. Cl. ........................................ 180/444; 74/427
(58) Field of Search ................................ 180/443, 444; 74/427

(56) References Cited

U.S. PATENT DOCUMENTS 6,390,230 B1 * 5/2002 Shimizu et al. ............. 180/444

FOREIGN PATENT DOCUMENTS

| CN | 1105166 A | 7/1995 |
| JP | 2-8124 | 2/1990 |
| JP | 8-207792 | 8/1996 |
| JP | 2000-43739 | 2/2000 |

* cited by examiner

Primary Examiner—Lesley D. Morris
Assistant Examiner—Matthew Luby
(74) Attorney, Agent, or Firm—Darby & Darby

(57) ABSTRACT

An electric power steering apparatus in which a shaft of a worm interlocking with rotation of a motor for steering assistance is movable in a radial direction, a pressing body for pressing the worm toward a worm wheel is provided, and the pressing body is provided with a V-shaped contact portion to abut in two circumferential positions of the shaft and an annular elastic body for restricting movement of the pressing body in a direction crossing the radial direction.

4 Claims, 25 Drawing Sheets

ELECTRIC POWER STEERING APPARATUS

BACKGROUND OF THE INVENTION

The present invention relates to an electric power steering apparatus using a motor as a source for generating steering assisting force.

An automobile is steered by transmitting an operation for rotating a steering wheel provided in a vehicle compartment to a steering mechanism provided outside the vehicle compartment for turning a wheel (generally a front wheel) for steering. FIG. 1 is a sectional view showing a conventional electric power steering apparatus and FIG. 2 is a sectional view showing a speed reducing mechanism portion. For example, as shown in FIG. 1, an electric power steering apparatus for an automobile comprises a first steering shaft 101 having an upper end coupled to a steering wheel 100 for steering, a second steering shaft 103 having an upper end coupled coaxially to a lower end of the first steering shaft 101 through a torsion bar 102 and a lower end coupled to a steering mechanism connected to a wheel, a torque sensor 104 for detecting a torque applied to the first steering shaft 101 by the rotation of the steering wheel 100 through a twist generated on the torsion bar 102, a steering assistance motor 105 to be driven based on the result of detection of the torque sensor 104, and a speed reducing mechanism having a worm 106 and a worm wheel 107 which are connected to an output shaft of the motor 105 and serve to reduce the speed of the rotation of the output shaft and to transmit the rotation to the second steering shaft 103, and the operation of the steering mechanism corresponding to the rotation of the steering wheel 100 is assisted by the rotation of the motor 105, thereby relieving a driver's labor and burden for steering.

The worm 106 constituting the speed reducing mechanism is supported in a fit hole of a housing 110 through a pair of rolling bearings 108 and 108 as shown in FIG. 2, and the second steering shaft 103 provided with the worm wheel 107 is supported in the fit hole of the housing 110 through a pair of rolling bearings 109 and 109 so that the movement of the worm 106 and the worm wheel 107 in radial and axial directions is blocked.

In the steering apparatus using the worm 106 and the worm wheel 107, thus, when the backlash amount of an engagement portion is large, a backlash sound is generated so that the backlash sound leaks into the compartment of the automobile. In order to reduce the backlash amount of the engagement portion of the worm 106 and the worm wheel 107 and to eliminate a beating sound through the backlash, the worm 106, the worm wheel 107, the rolling bearings 108 and 109, the second steering shaft 103 and the housing 110 which are processed such that a distance between the rotation centers of the worm 106 and the worm wheel 107 is coincident with a distance between the centers of the fit holes in which the rolling bearings 108 and 109 are fit within an allowance are selected and assembled. A long time is required for the assembly. Furthermore, while a high load is applied to rotate the worm 106 and the worm wheel 107 and a loading work for adapting the engagement portion after the assembly, a long time is required for the loading work so that an improvement has been demanded.

Moreover, the wear of the teeth of the worm 106 and the worm wheel 107 is increased, the atmospheric temperature of the worm wheel 107 formed of a synthetic resin is changed or the worm wheel 107 absorbs moisture so that the backlash amount is increased. Furthermore, there has been a problem in that the torque of the engagement portion is disordered and stock is increased through the selective assembly described above.

The present applicant has proposed an electric power steering apparatus (Japanese Patent Application Laid-Open No. 2000-43739) in which moving means (pressing means) such as an elastic body for moving, in a radial direction, a shaft on the opposite side to a motor in a worm having a motor side shaft rotatably supported in a housing through a rolling bearing, moving the bearing in abutment on the peripheral surface of a bearing fitted in the shaft and pressing the worm toward a worm wheel is provided and a distance between the rotation centers is regulated by operating the pressing means so that a backlash amount can be adjusted.

Moreover, the Japanese Patent Application Laid-Open No. 2000-43739 has also described an electric power steering apparatus in which pressing means for moving, in a radial direction, a motor side shaft of a worm having a shaft on the opposite side to the motor rotatably supported on a housing through a rolling bearing, moving the bearing in abutment on the peripheral surface of a bearing fitted in the shaft and pressing the worm toward a worm wheel is provided, a coupling portion of the motor side shaft of the worm and the output shaft of the motor is coupled through a constant velocity joint so that the worm can be slid around a bearing portion having the shaft on the opposite side to the motor supported thereon, the distance between the rotation centers is regulated by operating the pressing means so that a backlash amount can be adjusted.

On the other hand, as described in Japanese Utility Model Publication No. 2-8124 (1990), there has been known a worm type speed reducing machine in which pressing means having an insertion hole for inserting a bearing fitted in a shaft provided on one of ends of a worm and capable of moving in the radial direction of the shaft is provided such that the worm is pressed toward a worm wheel through the pressing means or pressing means having a pair of rollers abutting on two peripheral positions of the worm and capable of moving in the radial direction of the worm such the that worm is pressed toward the worm wheel through the pressing means.

However, the conventional pressing means is formed to be smoothly moved in a guide hole provided in a housing accommodating a worm, while the tooth trace of the worm wheel 107 of the speed reducing mechanism or the like is twisted in a rotation direction with respect to a rotation center line. Accordingly, when a rotation torque is to be applied from the worm 106 to the worm wheel 107, in other words, the steering is to be assisted through the rotation of the motor 105, a comparatively great component of force is generated such that the worm 106 is moved in a radial direction along the tooth trace of the worm wheel 107 so that the worm 106 is strongly pressed in the radial direction through the component of force. For this reason, in the conventional electric power steering apparatus having such a structure that the backlash amount is reduced by using the pressing means as described above, there has been a problem in that the pressing means is moved in a direction crossing the moving direction in the guide hole by the pressing force (component of force) applied to the worm 106 and abuts on the guide hole to make a sound.

In the electric power steering apparatus disclosed in the Japanese Patent Application Laid-Open No. 2000-43739, moreover, the pressing means provided in the guide hole is fitted in the shaft on one of the ends of the worm and simply abuts on the peripheral surface of the bearing movable in the radial direction. The pressing means does not block the movement of the bearing in a direction crossing the direction of movement of the pressing means. Therefore, when the pressing means presses the worm toward the worm wheel and the steering is assisted in the state in which the rotation center line of the worm is inclined with respect to the rotation center line during non-press, the worm is moved in the radial direction with respect to the rotation center line during the press by the component of force in the radial direction described above so that the worm is eccentrically rotated, in other words, carries out whirling. Consequently, there is also a problem in that the defective engagement of the engagement portion is caused and torque nonuniformity is generated. Moreover, it is necessary to provide pressing means for abutting on the bearing fitted in the shaft of the worm and the circumferential surface of the bearing. Consequently, there is also a problem in that the number of parts is increased, resulting in an increase in a cost.

In the worm type speed reducing machine disclosed in the Japanese Utility Model Publication No. 2-8124, moreover, the shaft on one of the ends of the worm is fitted and supported on the other end of the pressing means having one of the ends provided in the guide hole and the other end extended toward the outside from the guide hole, in other words, the shaft potion is overhung for the guide hole or the other end extended toward the outside from the guide hole supports the worm through a pair of rollers. The shaft or the worm does not block the movement in the direction crossing the direction of movement of the pressing means. Therefore, when the pressing means presses the worm toward the worm wheel and the steering is assisted in the state in which the rotation center line of the worm is inclined with respect to the rotation center line during the non-press, the worm is moved in the radial direction with respect to the rotation center line during the press by the component of force in the radiation direction described above and is eccentrically rotated, in other words, carries out whirling. Consequently, there is also a problem in that the defective engagement of the engagement portion is caused and torque nonuniformity is generated. Moreover, it is necessary to provide a pair of rollers on the pressing means. Consequently, there is a problem in that the number of parts is increased, resulting in an increase in a cost.

In the electric power steering apparatus disclosed in the Japanese Patent Application Laid-Open No. 2000-43739, moreover, in the case in which a steering wheel gets on a curb or the like so that a reverse input load is transmitted from the steering wheel through the steering shaft, the worm is pressed to go away from the worm wheel in the radial direction. In the electric power steering apparatus in which the backlash amount is reduced by the pressing means as describe above, accordingly, there is a possibility that the reverse input load might be applied from the worm to the pressing means so that the pressing means is excessively deformed elastically, and furthermore, the center of rotation of the worm might be inclined excessively so that shoulder getting is generated on the rolling bearing supporting the other end of the worm or the worm is broken.

In the electric power steering apparatus disclosed in the Japanese Patent Application Laid-Open No. 2000-43739, moreover, the shaft on one end side of the worm can be moved in the radial direction and the shaft on the other end side is simply supported rotatably by using a general rolling bearing. Therefore, the regulation margin of the distance between the rotation centers through the pressing means depends on the corner clearance of the general rolling bearing, in other words, the inclination of the inner ring of the rolling bearing. Accordingly, the regulation margin of the distance between the rotation centers, and furthermore, the regulation margin of the backlash amount are restricted. In the electric power steering apparatus, moreover, in the case in which the steering wheel gets on a curb or the like so that the reverse input load is transmitted to the worm from the steering wheel through the steering shaft, the pressing means side of the worm is moved to go away from the worm wheel in the radial direction and carries out whirling. At this time, in the electric power steering apparatus in which the regulation margin of the distance between the rotation centers depends on the corner clearance of the bearing as described above, in the case in which the whirling amount of the worm is comparatively increased through the reverse input load, there is a possibility that the shoulder getting might be generated on the rolling bearing supporting the other end of the worm, resulting in a breakage of the rolling bearing.

BRIEF SUMMARY OF THE INVENTION

It is an object of the present invention to solve the above-mentioned problems and to provide an electric power steering apparatus capable of eliminating a sound at a low cost.

It is another object of the present invention to solve the above-mentioned problems and to provide an electric power steering apparatus capable of preventing pressing means, a bearing, a worm and the like from being broken due to a reverse input load.

A first aspect of the present invention is directed to an electric power steering apparatus, comprising a driving gear interlocking with rotation of a motor for steering assistance and having a shaft movable in a radial direction thereof, a driven gear engaged with the driving gear and connected to a steering mechanism, and a pressing body pressing the driving gear toward the driven gear by moving the shaft in the radial direction, wherein the pressing body has a contact portion to abut on a peripheral surface of the shaft and an elastic body for restricting movement of the pressing body in a direction crossing the radial direction is provided around the pressing body. When the driving gear is pressed in the radial direction along the tooth trace of the driven gear and the pressing force is applied to the pressing body, the movement of the pressing body can be restricted by the elastic body provided around the pressing body. Therefore, it is possible to eliminate a sound made by the movement of the pressing body to hit the housing. In addition, the pressing body abuts on the shaft of the driving gear. Therefore, it is possible to reduce the number of parts as compared with the conventional arts using a pressing body or a roller to abut on the bearing. Consequently, a cost can be reduced.

In the electric power steering apparatus according to the first aspect, the contact portion is provided in an approximate middle position in the radial direction of the pressing body and the elastic body is provided in both side positions in the radial direction with being separated from the contact portion and/or the shaft. When the driving gear is pressed in the radial direction along the tooth trace of the driven gear and the pressing force is applied to the pressing body, the movement of the pressing body can be restricted by the elastic body. Therefore, the pressing body can be prevented from being inclined and can be maintained in such a state as to be moved in the radial direction.

A second aspect of the present invention is directed to an electric power steering apparatus, comprising a driving gear interlocking with rotation of a motor for steering assistance and having a shaft movable in a radial direction thereof, a driven gear engaged with the driving gear and connected to a steering mechanism, and a pressing body pressing the driving gear toward the driven gear by moving the shaft in the radial direction, wherein the pressing body has a contact portion to abut in at least two circumferential positions of the shaft. The contact portion abuts in the two circumferential positions of the shaft to press the driving gear toward the driven gear. Therefore, when the driving gear is pressed in the radial direction along the tooth trace of the driven gear, it is possible to prevent the shaft from being moved with respect to the pressing body and to eliminate a sound made by the hit of the shaft on the pressing body. In addition, the pressing body abuts on the shaft of the driving gear. Therefore, it is possible to reduce the number of parts as compared with the conventional arts using a pressing body or a roller to abut on the bearing. Consequently, a cost can be reduced.

In the electric power steering apparatus according to the second aspect, the contact portion is provided in an approximate middle position in the radial direction of the pressing body and an elastic body for restricting movement in a direction crossing the radial direction of the pressing body is provided in both side positions in the radial direction with being separated from the contact portion and/or the shaft. When the driving gear is pressed in the radial direction along the tooth trace of the driven gear and the pressing force is applied to the pressing body, the movement of the pressing body can be restricted by the elastic body. Therefore, the pressing body can be prevented from being inclined and can be maintained in such a state as to be moved in the radial direction.

A third aspect of the present invention is directed to an electric power steering apparatus, comprising a driving gear interlocking with rotation of a motor for steering assistance and having a shaft movable in a radial direction thereof, a driven gear engaged with the driving gear and connected to a steering mechanism, a pressing body pressing the driving gear toward the driven gear by moving, the shaft in the radial direction, and a guide member provided with a guide hole for guiding movement of the pressing body, wherein the pressing body has a fit hole having the shaft fitted therein in an approximate middle position in the radial direction along the guide hole and has a motion block portion for blocking movement in a direction crossing the radial direction in contact with the guide hole in both end portions in the radial direction with respect to the fit hole. The motion block portion provided in both end portions in the radial direction along the guide hole of the pressing body with respect to the fit hole in which the shaft of the driving gear is fitted comes in contact with the guide hole to block the movement of the pressing body in a, direction crossing the radial direction, thereby supporting the shaft with respect to the guide hole. Therefore, when the pressing body presses the worm toward the worm wheel and the steering assistance is carried out with the rotation center line of the worm inclined with respect to the rotation center line during non-press, it is possible to prevent the worm from being moved in the radial direction with respect to the rotation center line during press through a component of force in the radial direction. Accordingly, the whirling operation of the worm can be prevented and the engagement portion can be engaged well, and a torque nonuniformity can be eliminated. Moreover, the pressing body supports the shaft. Therefore, it is possible to reduce the number of parts as compared with the conventional art in which the shaft is supported by using a bearing. Thus, a cost can be reduced.

In the electric power steering apparatus according to the third aspect, a plain bearing for permitting a slippage in an axial direction of the shaft is provided in the fit hole portion. The shaft of the worm is fitted in the plain bearing. Therefore, even if the component of force of the pressing force in the radial direction which is to be applied to the worm is applied in the axial direction, the worm can be moved smoothly in the axial direction and the rotation resistance of the worm can be reduced.

In the electric power steering apparatus according to the third aspect, a clearance for permitting an inclination of the shaft with respect to a center of the fit hole is provided between the fit hole and the shaft. When the pressing body presses the worm toward the worm wheel and the steering aiding is carried out with the rotation center line of the worm inclined with respect to the rotation center line during the non-press, the shaft of the worm can be inclined well and the rotation resistance of the worm can be reduced.

A fourth aspect of the present invention is directed to an electric power steering apparatus, comprising a driving gear movable in a radial direction thereof interlockingly with rotation of a motor for steering assistance, a driven gear engaged with the driving gear and connected to a steering mechanism, a pressing body pressing the driving gear toward the driven gear, and restricting means for restricting separating movement of the driving gear with respect to the driven gear. The backlash amount of the engagement portion can be decreased by the pressing body. In addition, a reverse input load applied to the driving gear is applied by the restricting means provided separately from the pressing body, thereby restricting the separating movement of the driving gear with respect to the driven gear. Therefore, it is possible to prevent the pressing body from being broken due to the reverse input load and to well prevent shoulder getting from being generated on the bearing supporting the driving gear or the worm from being broken.

A fifth aspect of the present invention is directed to the electric power steering apparatus according to the fourth aspect, further comprising a supporting member for supporting the driving gear, wherein the restricting means is provided on at least one of the driving gear and the supporting member. The restricting means can be provided on the supporting member of the driving gear. Therefore, the structure of the restricting means can be simplified, the processing and assembling workability of the restricting means can be enhanced and a cost can be reduced comparatively.

A sixth aspect of the present invention is directed to the electric power steering apparatus according to the fifth aspect, wherein the driving gear includes a shaft on one of ends in an axial direction, the supporting member has a concave hole in which the shaft is to be inserted and a holding hole facing an inside of the concave hole and holding the pressing body, and the restricting means is provided on at least one of the shaft and the concave hole. The restricting means is provided on at least one of the shaft of the driving gear and the concave hole in which the shaft is to be inserted. Therefore, the restricting means can be formed to have a comparatively small size, and it is possible to avoid an increase in the size of the speed reducing mechanism portion through the restricting means.

In the electric power steering apparatus according to the sixth aspect, the restricting means is a ring attached to the inside of the concave hole. The ring is attached to the concave hole having a comparatively small diameter in which the shaft of the driving gear is to be inserted. Therefore, it is possible to simply provide the restricting means without changing the existing supporting structure of the driving gear.

In the electric power steering apparatus according to the sixth aspect, the restricting means is a thicker-diameter portion formed integrally with the shaft. When the shaft of the driving gear is to be processed, the restricting means can be provided together with the shaft. Therefore, the work for assembling the restricting means is not required. Consequently, it is possible to reduce a cost still more.

In the electric power steering apparatus according to the sixth aspect, the restricting means is a ring attached to the shaft. The ring is attached to the shaft, therefore, it is possible to simply provide the restricting means without changing the existing supporting structure of the driving gear.

A seventh aspect of the present invention is directed to an electric power steering apparatus, comprising a driving gear supported rotatably in a housing through a bearing interlockingly with rotation of a motor for steering assistance, a driven gear engaged with the driving gear and connected to a steering mechanism, a pressing body pressing the driving gear toward the driven gear at a free end side of the driving gear, and a convex provided on at least one of an inner peripheral side portion and an outer peripheral side portion in the bearing and permitting a rocking operation of the driving gear. The convex provided on at least one of the inner peripheral side portion and the outer peripheral side portion in the bearing supporting the worm in the housing permits the rocking operation of the driving gear. Therefore, in such a structure that the worm is rocked by the pressing body for moving the driving gear in the radial direction, the worm can be rocked at a rocking angle which is equal to or greater than the corner clearance of the bearing. Thus, the regulation margin of the backlash amount can be increased. Moreover, in the case in which the reverse input load is transmitted to the driving gear, the driving gear can be rocked at a rocking angle which is equal to or greater than the corner clearance of the bearing by using the convex as a fulcrum. Therefore, it is possible to prevent the bearing from being broken due to the reverse input load.

In the electric power steering apparatus according to the seventh aspect, the housing and the driving gear have a fit portion in which the bearing is to be fitted and the convex is formed such that a sectional shape in an axial direction of the fit portion is arcuate. The fit portion of the housing and the driving gear is formed to be arcuate. Therefore, a special part is not required and a cost can be reduced. In addition, an existing bearing can be used, and furthermore, the axial length of the driving gear can be shortened comparatively.

The above and further objects and features of the invention will more fully be apparent from the following detailed description with accompanying drawings.

DETAILED DESCRIPTION OF THE INVENTION

Figure 1:
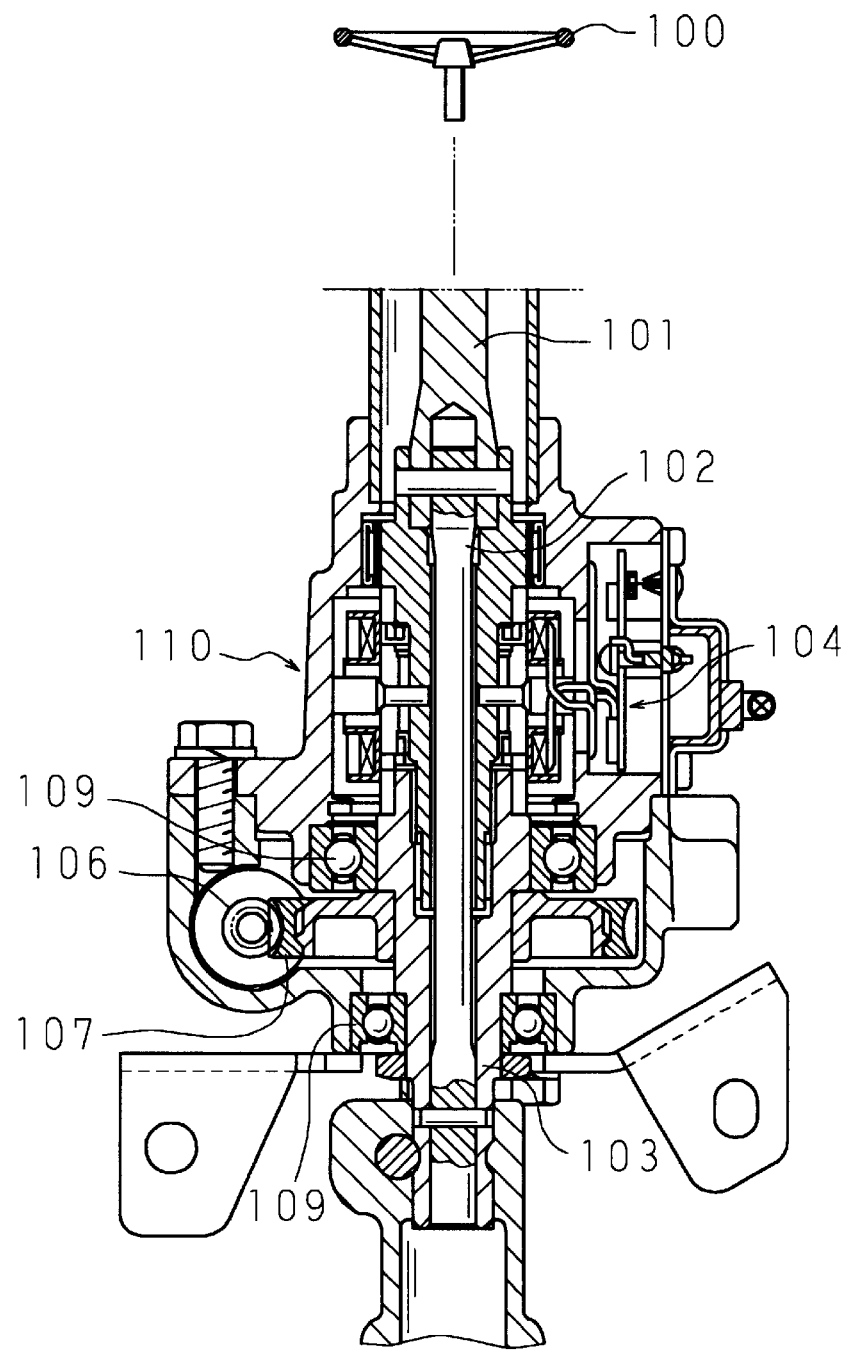
FIG. 1 is a sectional view showing a conventional electric power steering apparatus.
Figure 2:
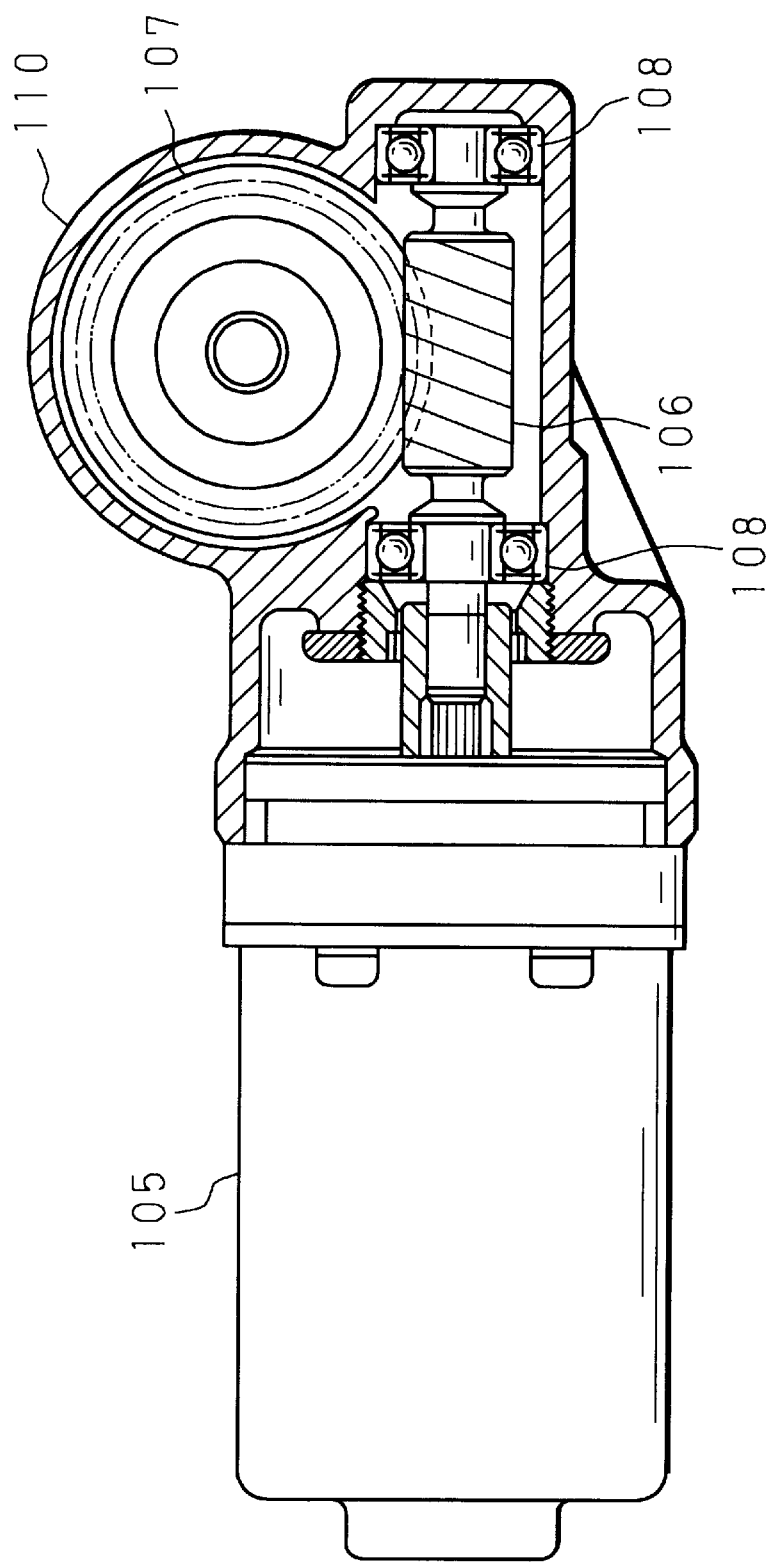
FIG. 2 is a sectional view showing a speed reducing mechanism portion of the conventional electric power steering apparatus.
Figure 3:
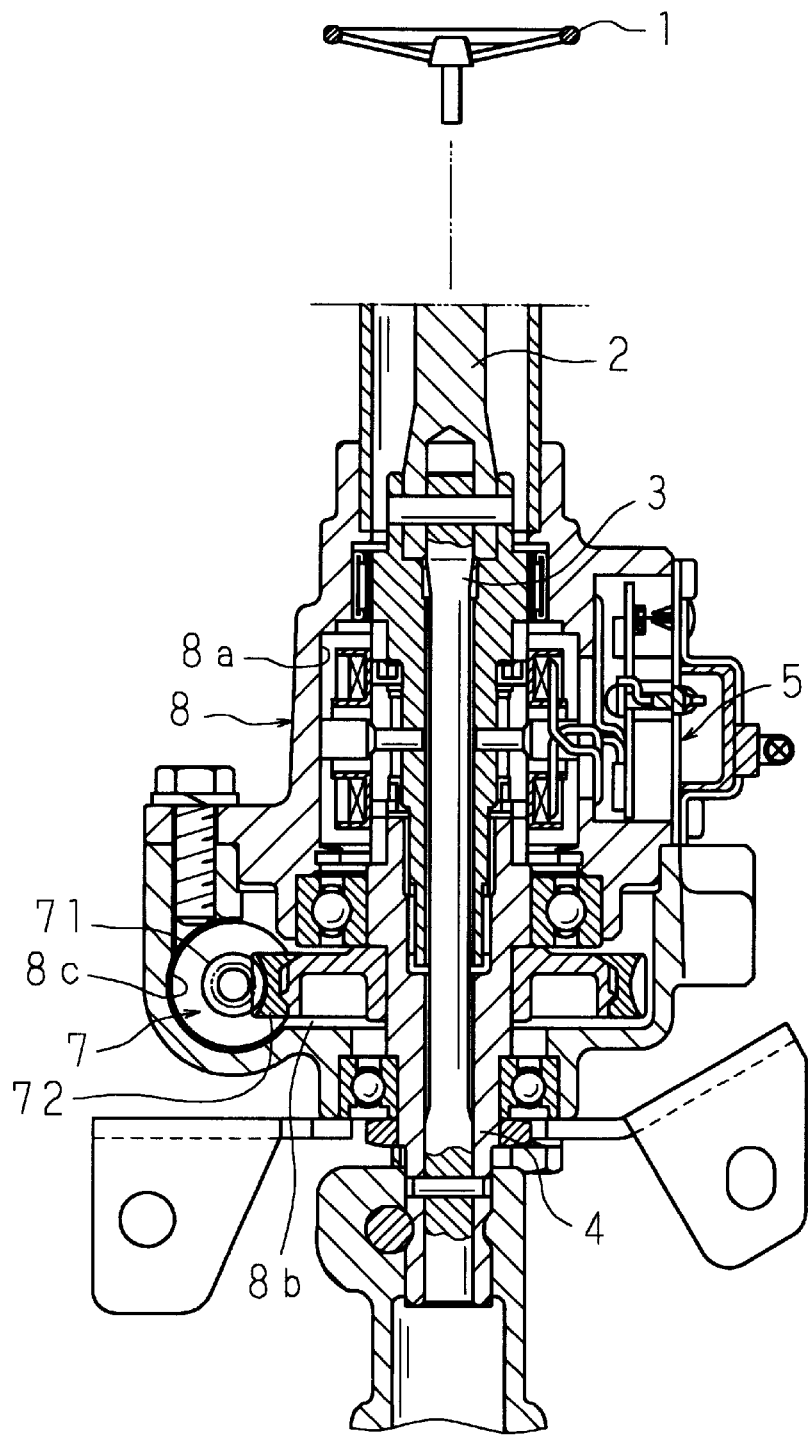
FIG. 3 is a sectional view showing an electric power steering apparatus according to the present invention.

Preferred embodiments of the present invention will be described below in detail with reference to the drawings.
First Embodiment FIG. 3 is a sectional view showing an electric power steering apparatus according to the present invention. The electric power steering apparatus comprises a first steering shaft 2 having one of ends connected to a steering wheel 1 for steering and the other end provided with a cylindrical portion, a torsion bar 3 inserted in the cylindrical portion, having one of ends coupled coaxially to the other end of the first steering shaft 2 and twisted by the action of a steering torque applied to the steering wheel 1, a second steering shaft 4 having one of ends inserted around the cylindrical portion and the other end coupled coaxially to the other end of the torsion bar 3, a torque sensor 5 for detecting a steering torque applied to the steering wheel 1 based on the relative rotation displacement of the first and second steering shafts 2 and 4 according to the twist of the torsion bar 3, a motor 6 for assisting the steering which is to be driven based on the torque detected by the torque sensor 5, a speed reducing mechanism 7 having a driving gear (hereinafter referred to as a worm) 71 and a driven gear (hereinafter referred to as a worm wheel) 72 which serve to reduce the speed of the rotation and to transmit the rotation to the second steering shaft 4 interlockingly with the rotation of the motor 6, and a housing 8 in which the torque sensor 5 and the speed reducing mechanism 7 are accommodated. The motor 6 is attached to the housing 8.

The housing 8 includes a first accommodating portion 8a for accommodating the torque sensor 5, a second accommodating portion 8b for accommodating the worm wheel 72 successively to the first accommodating portion 8a, and a third accommodating portion 8c for accommodating the worm 71 successively to the second accommodating portion 8b. The motor 6 having a case communicating with the third accommodating portion 8c is attached to the housing 8.

Figure 4:
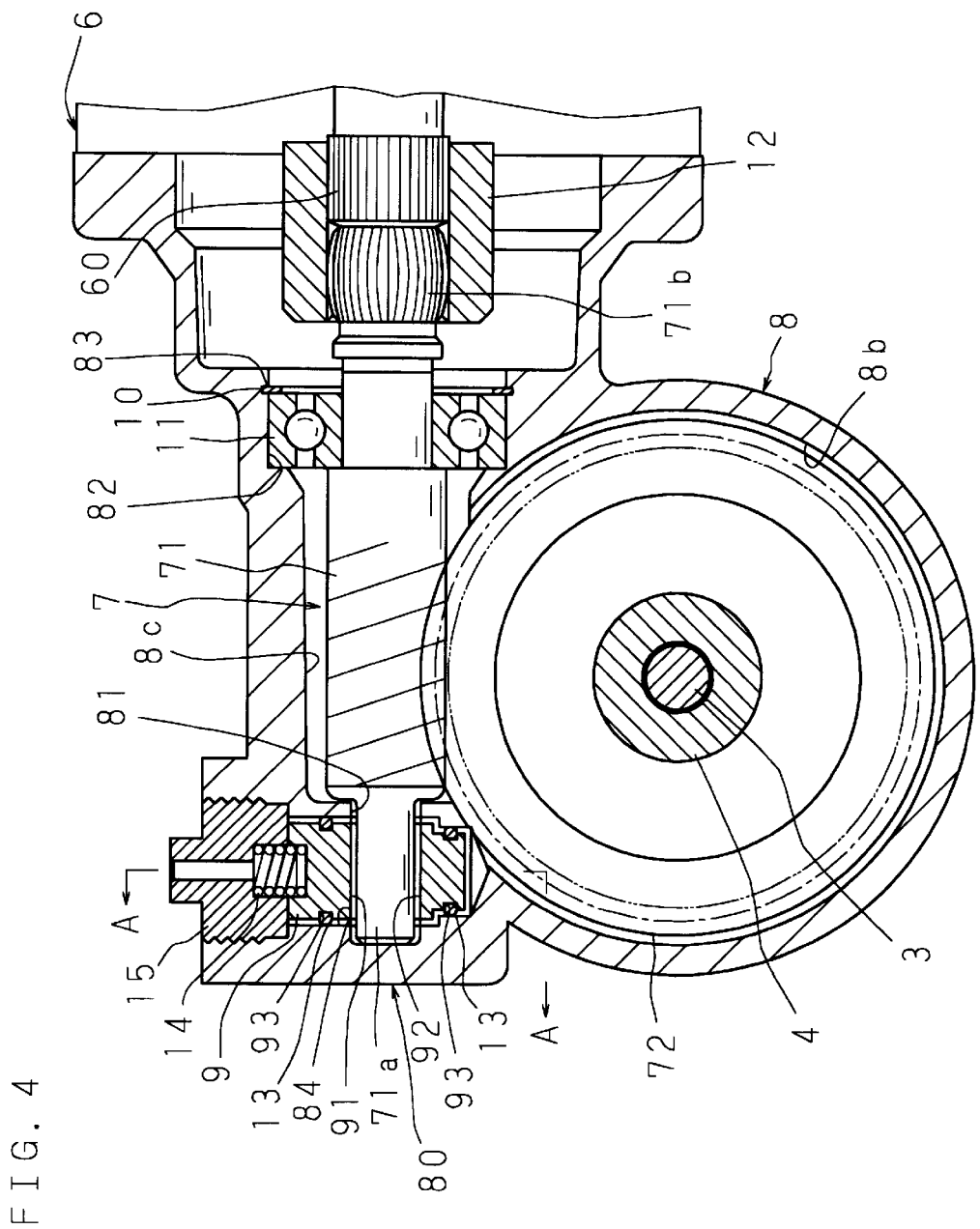
FIG. 4 is a sectional view showing a speed reducing mechanism portion according to a first embodiment of the electric power steering apparatus in accordance with the present invention.

FIG. 4 is a sectional view showing a speed reducing mechanism portion. The third accommodating portion 8c is extended in the axial direction of the worm 71 and has a guide member 80 provided integrally with one of ends in a longitudinal direction thereof. The guide member 80 has a concave hole 81 in which a shaft 71a provided on one of ends of the worm 71 is to be inserted and has a cylindrical guide hole 84 which faces the internal surface of the concave hole 81 and is provided in the radial direction of the shaft 71a. Moreover, there are provided, on the other end of the third accommodating portion 8c, a fit hole 82 and an annular groove 83 successively to the fit hole 82, and a snap ring 10 is fitted in the annular groove 83.

The speed reducing mechanism 7 includes the worm 71 connected to an output shaft 60 of the motor 6 and the worm wheel 72 fitted and fixed into the middle of the second steering shaft 4 and connected to a steering mechanism. The engagement of the worm 71 and the worm wheel 72 reduces the speed of the rotation of the output shaft 60 and transmits the rotation to the second steering shaft 4 and from the second steering shaft 4 to a steering mechanism of a rack and pinion type (not shown), for example, through a universal joint.

The worm 71 is provided to cross the core of the second steering shaft 4 and has shafts 71a and 71b provided on both ends thereof. The shaft 71a on one of the ends is inserted in the concave hole 81, and furthermore, is supported rotatably through a pressing body 9 accommodated in the guide hole 84 to be movable in an axial direction. The shaft 71b on the other end is supported rotatably on the fit hole 82 through a rolling bearing 11 and constrains the movement of the rolling bearing 11 in the axial direction through the snap ring 10 fitted in the annular groove 83. Moreover, the shaft 71b on the other end is spline fitted in the internal surface of a cylinder 12 and is coupled to an output shaft 60. The shaft 71b has a peripheral surface curved in the form of a convex with respect to a core as shown in FIG. 4 and can rock the worm 71 around the curved peripheral surface.

Figure 5:
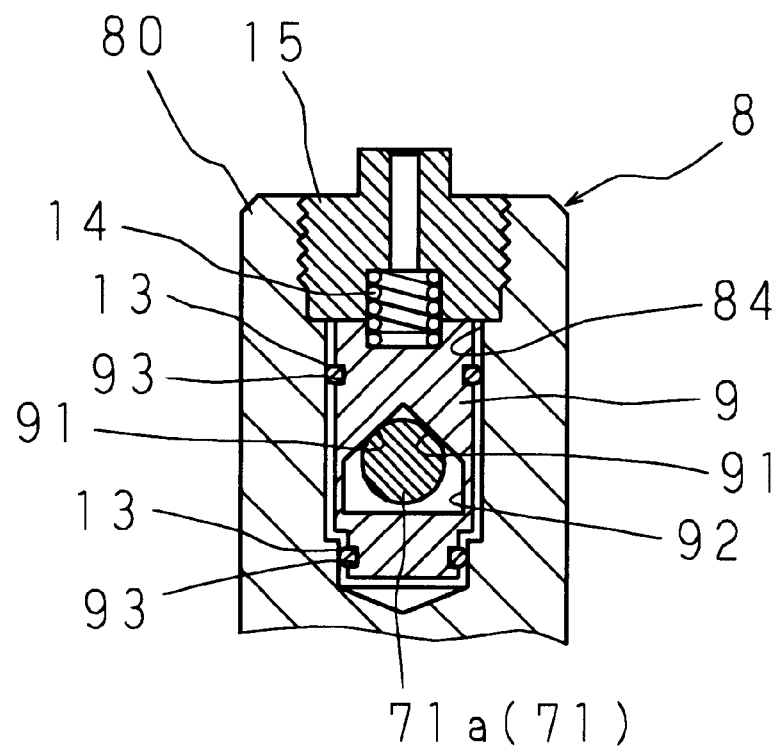
FIG. 5 is an enlarged sectional view taken along the line A—A in FIG. 4.

FIG. 5 is an enlarged sectional view taken along the line A—A in FIG. 4. The pressing body 9 is formed cylindrically of a synthetic resin material, and has a contact portion 91 abutting on the peripheral surface of the shaft 71a in an approximate middle position in the axial direction, that is, an approximate middle position in a direction of movement along the guide hole 84 (in a radial direction of the shaft 71a). Moreover, an insertion hole 92 in which the shaft 71a is to be inserted is provided on the pressing body 9, and annular elastic bodies 13 and 13 for restricting the movement of the pressing body 9 in a direction crossing the direction of movement are provided in both side positions in the direction of movement with respect to the contact portion 91. The pressing body 9 has a small diameter portion and a large diameter portion where the elastic bodies 13 and 13 are provided, and the diameter may be almost equal over the whole length and the shape thereof is not particularly restricted.

An O ring formed of synthetic rubber is used for the elastic bodies 13 and 13. The elastic bodies 13 and 13 are fitted in a pair of annular grooves 93 and 93 formed apart from each other over the peripheral surface of the pressing body 9 and the elastic bodies 13 and 13 come in contact with the internal surface of the guide hole 84, thereby limiting the movement in the direction crossing the direction of movement of the pressing body 9. The contact portion 91 is formed by an almost V-shaped slant 5 surface to abut on at least two peripheral positions of the shaft 71a and moves the pressing body 9 in the radial direction of the shaft 71a in abutment on the shaft 71a, thereby pressing the worm 71 toward the worm wheel 72. Moreover, the pressing body 9 is energized in the direction of movement through energizing means 14. The energizing 14 is formed of an elastic body such as a coil spring and is provided between an adjusting screw 15 screwed into the open edge portion of the guide hole 84 and the pressing body 9, and serves to press the contact portion 91 of the pressing body 9 by the comparatively small force of the energizing means 14 against the shaft 71a, thereby energizing the worm 71 to an engagement point with the worm wheel 72.

In the first embodiment, in the case in which the worm 71 is to be incorporated, the pressing body 9 is moved by the operation of the adjusting screw 15 to cause the worm 71 to come in contact with the worm wheel 72, to turn the worm wheel 72 and confirm that a backlash is not generated. Thus, the backlash amount of the engagement portion of the worm 71 and the worm wheel 72 can be eliminated.

The worm 71 is pressed through steering assistance in the radial direction along the tooth trace of the worm wheel 72. When the pressing force is applied from the shaft 71a to the contact portion 91 of the pressing body 9, the movement to be carried out by the pressing force of the pressing body 9 can be controlled through the elastic bodies 13 and 13 provided on the peripheral surface of the pressing body 9.

Accordingly, it is possible to prevent the pressing body 9 to abut on the guide hole 84 of the housing 8, thereby eliminating a sound made by the abutment. In addition, the contact portion 91 of the pressing body 9 abuts in the two peripheral positions of the shaft 71*a*, that is, presses the shaft 71*a* through two-point contact. Therefore, when the pressing force is applied to the worm 71, the shaft 71*a* can be prevented from being moved with respect to the pressing body 9. Accordingly, it is possible to eliminate a sound made by the movement of the shaft 71*a*.

Furthermore, the contact portion 91 of the pressing body 9 is provided in an approximate middle position of the pressing body 9 in the direction of movement along the guide hole 84 (in the radial direction of the shaft 71*a*) and the annular elastic bodies 13 and 13 are provided in both side positions in the direction of movement with respect to the contact portion 91. Therefore, it is possible to the pressing body 9 from being inclined around the contact portion 91. Accordingly, when the worm 71 is pressed in the radial direction along the tooth trace of the worm wheel 72, the pressing body 9 can be prevented from being inclined and can be maintained in such a state that the pressing body 9 can be moved in the direction of movement. In other words, in the case in which the elastic bodies 13 and 13 are not provided, the pressing body 9 may be inclined in the guide hole 84 by the pressing force and the edge of the pressing body 9 thus inclined is engaged to cut into the internal surface of the guide hole 84 in some cases. In this state, the movement of the pressing body 9 is locked so that the worm 71 cannot be pressed toward the worm wheel 72. In the present invention, however, the pressing body 9 can be prevented from being inclined. Therefore, the movement of the pressing body 9 is not locked. Moreover, the pressing body 9 is energized by the energizing means 14. Therefore, also in the case in which the teeth of the worm 71 and the worm wheel 72 are worn, the backlash can be prevented well.

While the elastic body 13 is provided on the peripheral surface of the pressing body 9 in the first embodiment described above, the elastic body 13 may be provided on the peripheral surface of the guide hole 84 for guiding the movement of the pressing body 9. Moreover, the elastic body 13 is ring-shaped, and furthermore, may be plate-shaped, may be fixed through an adhesive, with vulcanizing bonding, fitting in a concave portion provided on the peripheral surface of the pressing body 9 or the guide hole 84.

While the contact portion 91 of the pressing body 9 has been formed by the almost V-shaped slant face in the first embodiment described above, the contact portion 91 may be circular or almost U-shaped and the shape is not particularly restricted thereto.

Second Embodiment

Figure 6:
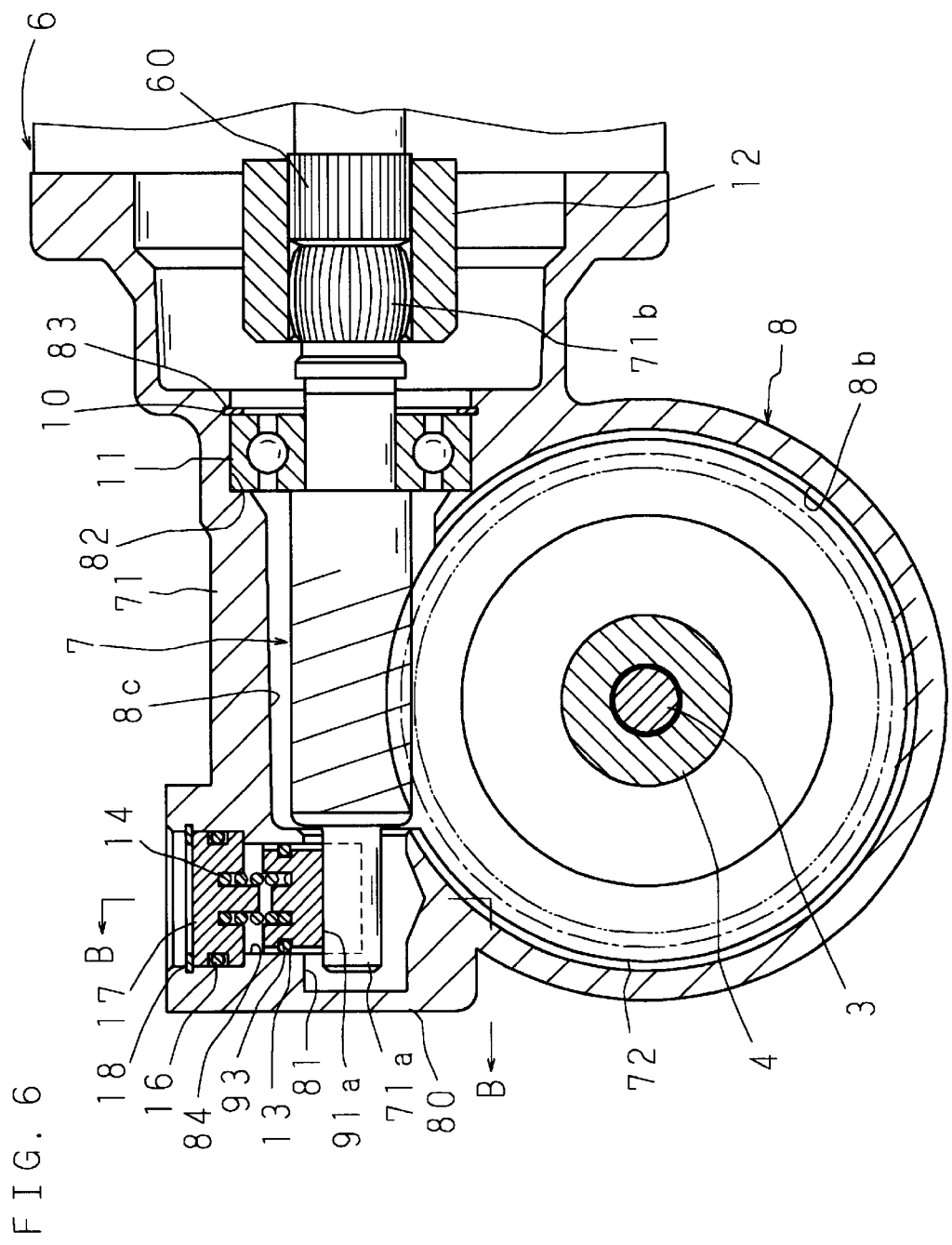
FIG. 6 is a sectional view showing a speed reducing mechanism portion according to a second embodiment of the electric power steering apparatus in accordance with the present invention.
Figure 7:
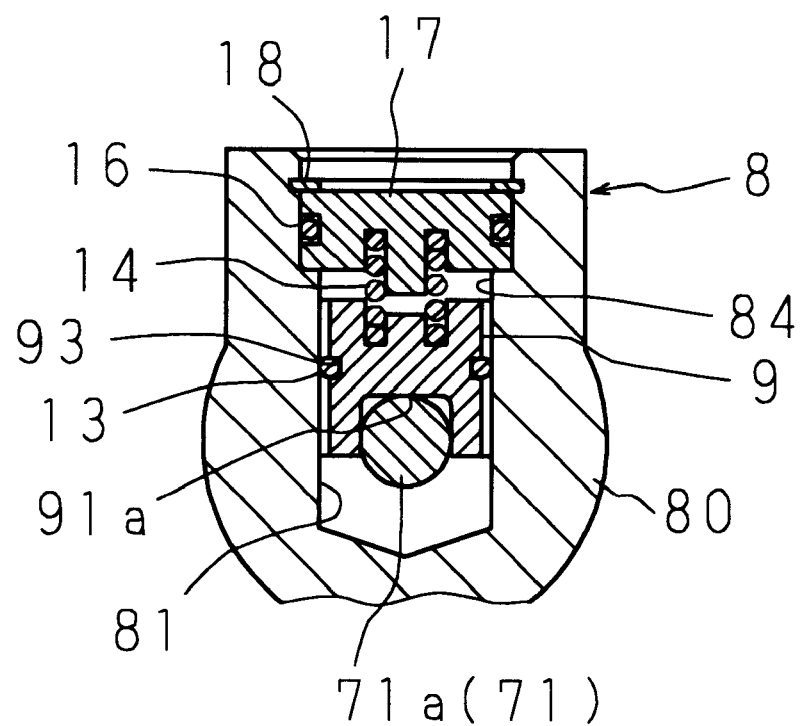
FIG. 7 is an enlarged sectional view taken along the line B—B in FIG. 6.

FIG. 6 is a sectional view showing a speed reducing mechanism portion according to a second embodiment and FIG. 7 is an enlarged sectional view taken along the line B—B in FIG. 6. In an electric power steering apparatus according to the second embodiment, an almost U-shaped contact portion 91*a* to abut on a shaft 71*a* is provided on one of ends of a pressing body 9, an annular groove 93 is provided on the peripheral surface of the pressing body 9 and an elastic body 13 is fitted in the annular groove 93 instead of providing the contact portion 91 in the approximate middle position of the pressing body 9 in the direction of movement.

Moreover, a cover body 17 having a sealing ring 16 on a peripheral surface thereof and a snap ring 18 for stopping the movement of the cover body 17 are fitted in the open edge portion of a guide hole 84, and a coil spring of energizing means 14 is provided between the cover body 17 and the pressing body 9. The contact portion 91*a* may be formed by almost V-shaped slant face to abut on two circumferential positions of the shaft 71*a* in the same manner as the contact portion 91 according to the first embodiment and a shape thereof is not particularly limited. Since other structures and functions are the same as those in the first embodiment, the same parts have the same reference numerals, and detailed description thereof and explanation of functions will be omitted.

Third Embodiment

Figure 8:
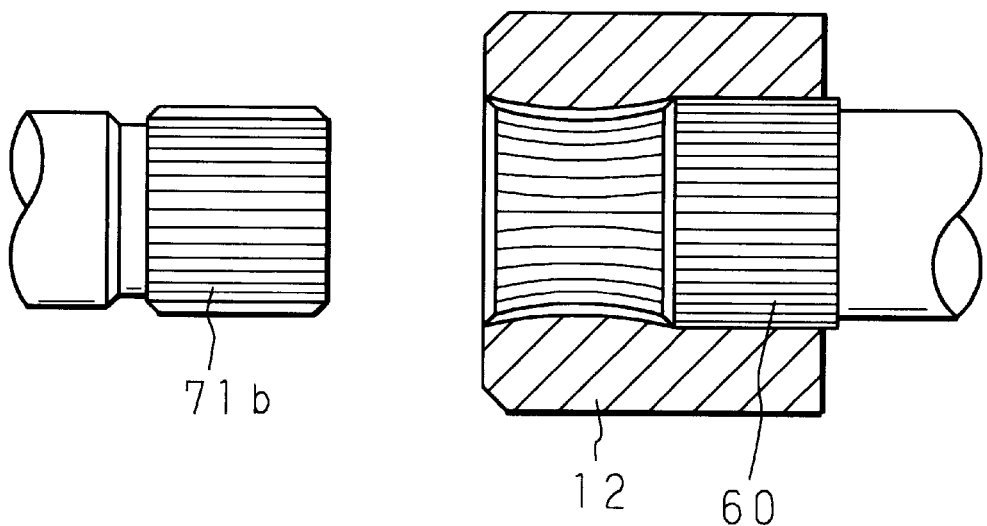
FIG. 8 is a sectional view showing a coupling portion of a speed reducing mechanism and a motor according to a third embodiment of the electric power steering apparatus in accordance with the present invention.

FIG. 8 is a sectional view showing a coupling portion of a speed reducing mechanism and a motor according to a third embodiment. In an electric power steering apparatus according to the third embodiment, the internal surface of a cylinder 12 provided with a spline is curved to have a concave shape with respect to a core and a shaft 71*b* is spline fitted in the curved peripheral surface instead of causing the shaft 71*b* to have a convex curved peripheral surface. Consequently, the worm 71 can be rocked around the curved peripheral surface. Since other structures and functions are the same as those in the first embodiment, the same parts have the same reference numerals and detailed description thereof and explanation of functions will be omitted.

Fourth Embodiment

Figure 9:
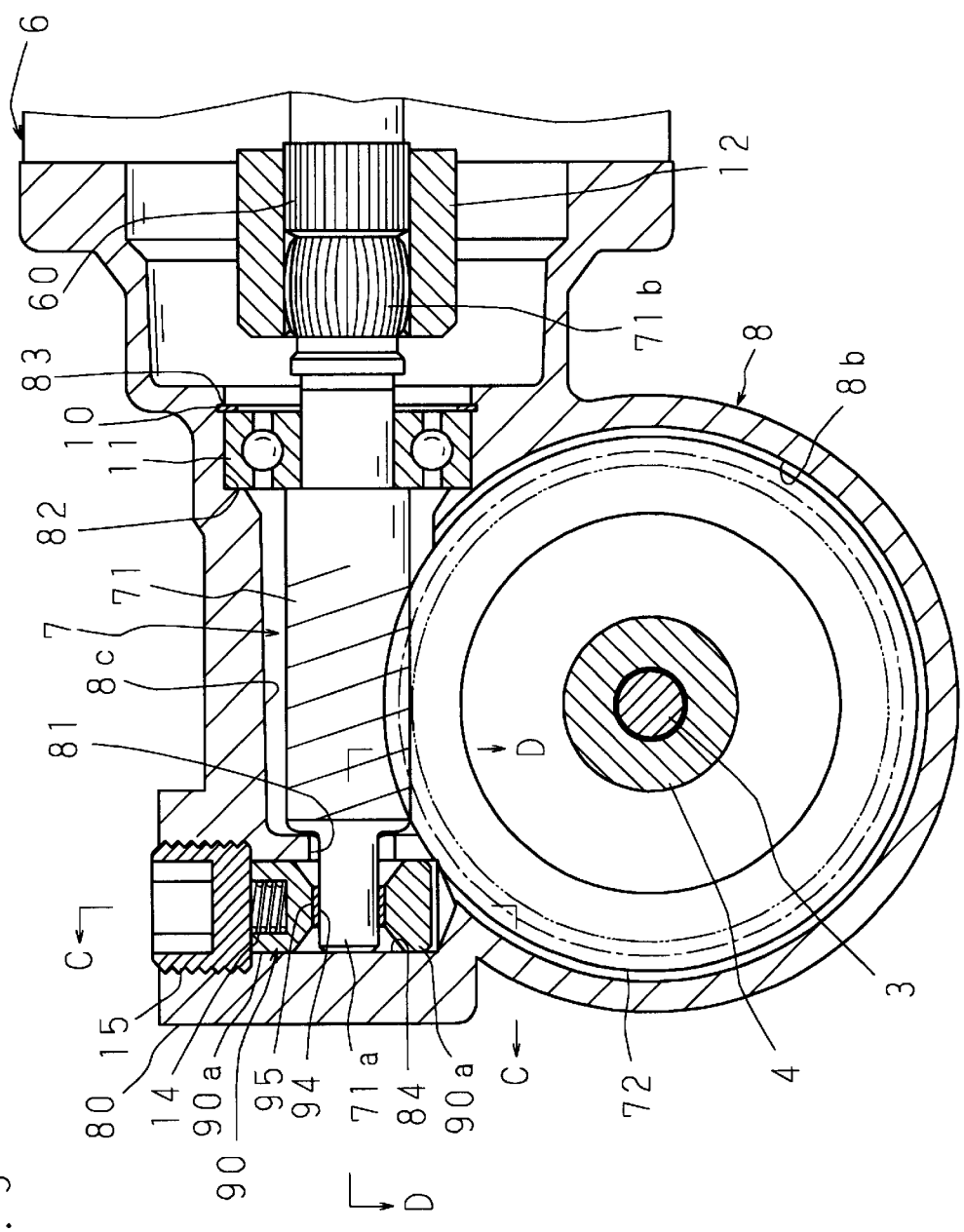
FIG. 9 is a sectional view showing a speed reducing mechanism portion according to a fourth embodiment of the electric power steering apparatus in accordance with the present invention.
Figure 10:
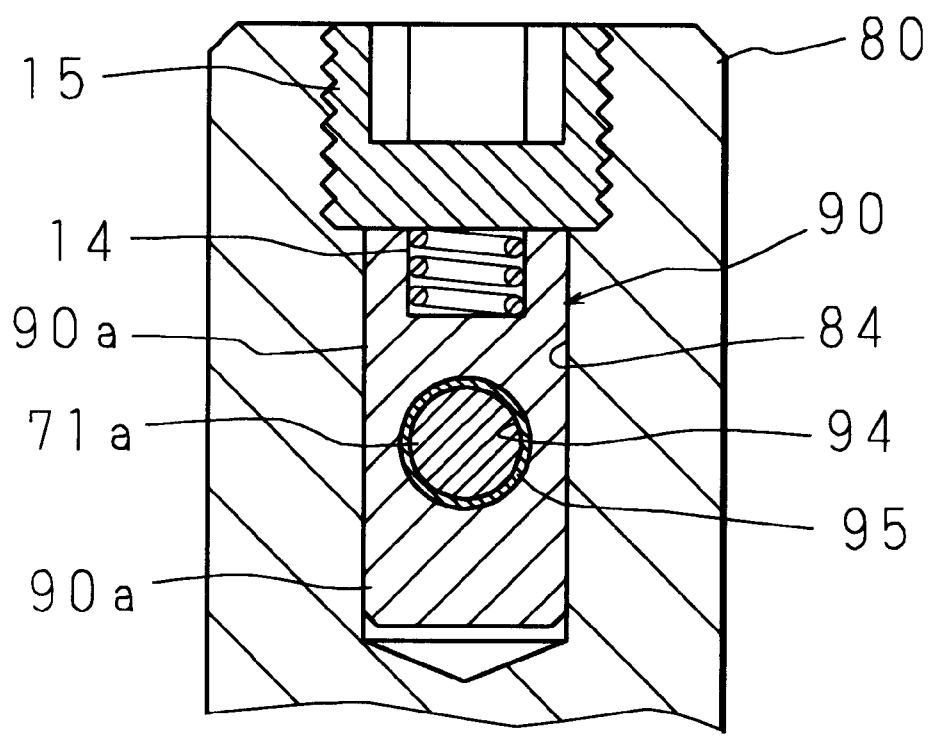
FIG. 10 is an enlarged sectional view taken along the line C—C in FIG. 9.
Figure 11:
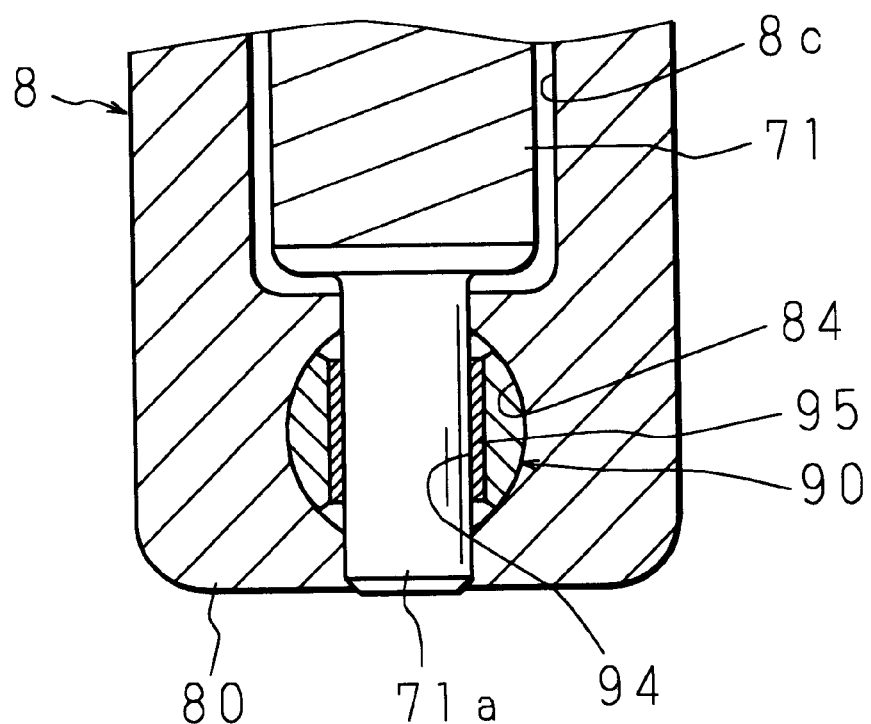
FIG. 11 is an enlarged sectional view taken along the line D—D in FIG. 9.
Figure 12:
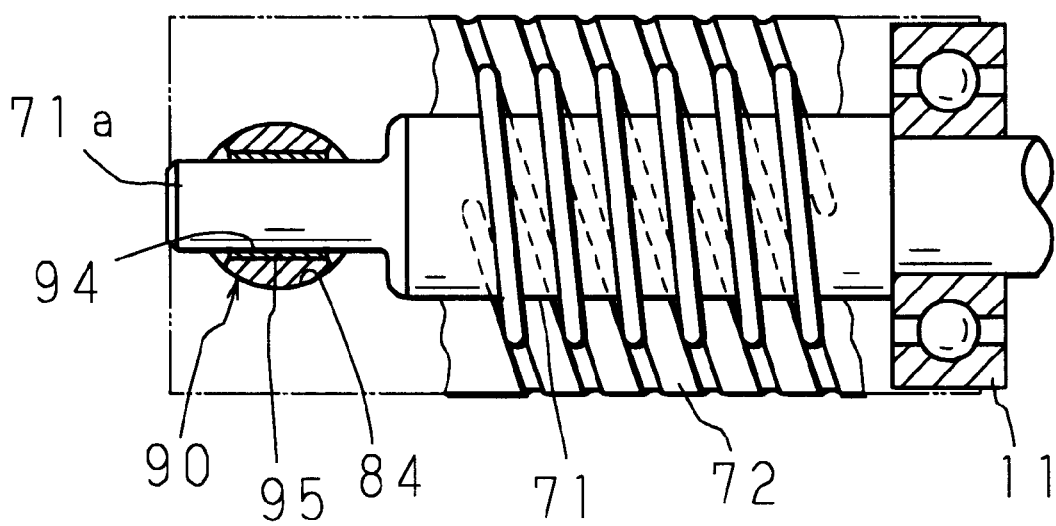
FIG. 12 is a plan view showing a speed reducing mechanism portion according to the fourth embodiment of the electric power steering apparatus in accordance with the present invention.

FIG. 9 is a sectional view showing a speed reducing mechanism portion according to a fourth embodiment, FIG. 10 is an enlarged sectional view taken along the line C—C in FIG. 9, FIG. 11 is an enlarged sectional view taken along the line D—D in FIG. 9, and FIG. 12 is a plan view showing the speed reducing mechanism portion. In an electric power steering apparatus according to the fourth embodiment, a pressing body 90 having a fit hole 94 for fitting a shaft 71*a* in an approximate middle position in the direction of movement (in the radial direction of the shaft 71*a*) and provided with motion block portions 90*a* and 90*a* for blocking a motion in a direction crossing the direction of movement in contact with a guide hole 84 in both end portions in the direction of movement with respect to the fit hole 94 is movably held in the guide hole 84 in place of the pressing body 9 provided with the contact portions 91 and 91*a*, and the shaft 71*a* is supported on the guide hole 84.

In the fourth embodiment, the pressing body 90 is formed cylindrically of a metal material and is provided with the fit hole 94 in an approximate middle position in an axial direction, that is, an approximate middle position in the direction of movement along the guide hole 84. The fit hole 94 portion is formed by fitting and fixing a cylindrical plain bearing 95 formed of a synthetic resin into a through hole formed to have a larger diameter than the inside diameter of the fit hole 94, and the plain bearing 95 allows for the slide of the shaft 71*a* in an axial direction. Between the fit hole 94 and the shaft 71*a* is provided a clearance for permitting that the shaft 71*a* is inclined with respect to the center of the fit hole 94, that is, the worm 71 is inclined when the pressing body 90 presses the worm 71 toward the worm wheel 72. The clearance is set to approximately $5/100$ to $8/100$ mm.

Moreover, the pressing body 9 is energized in the direction of movement through energizing means 14. The energizing means 14 is formed of an elastic body such as a coil spring and is provided between an adjusting screw 15 screwed into the open edge portion of the guide hole 84 and the pressing body 90, and serves to press the pressing body 90 by the comparatively small force, thereby energizing the worm 71 to an engagement point with the worm wheel 72.

In the fourth embodiment, in the case in which the worm 71 is to be incorporated, the pressing body 90 is moved by the operation of the adjusting screw 15 to cause the worm 71 to come in contact with the worm wheel 72, to turn the worm wheel 72 and to confirm that a backlash is not generated. Thus, the backlash amount of the engagement portion of the worm 71 and the worm wheel 72 can be eliminated. When the worm 71 is thus incorporated, the shaft 71a of the worm 71 is fitted in the fit hole 94 provided in the approximate middle of the pressing body 90 in an axial direction, and furthermore, motion block portions 90a and 90a provided in both end portions of the pressing body 90 in the direction of movement along the guide hole 84 with respect to the fit hole 94 come in contact with the guide hole 84 to block the motion of the pressing body 90 in a direction crossing the direction of movement and supports the shaft 71a on the guide hole 84. When the worm 71 is pressed in a radial direction along the tooth trace of the worm wheel 72 by steering assistance and the pressing force, that is, a component of force in the radial direction described above is added from the shaft 71a to the fit hole 94 of the pressing body 90, the motion block portions 90a and 90a provided in both end portions of the pressing body 90 in the direction of movement with respect to the fit hole 94 can block the motion of the pressing body 90 by the pressing force. Accordingly, when the pressing body 90 presses the worm 71 toward the worm wheel 72 and the steering is assisted in such a state that the rotation center line of the worm 71 is inclined with respect to a rotation center line during non-press, the worm 71 can be prevented from being whirled, the engagement portion can be engaged well and the torque nonuniformity of the engagement portion can be eliminated.

Moreover, a clearance for permitting the inclination of the shaft 71a with respect to the center of the fit hole 94 is provided between the fit hole 94 and the shaft 71a. Therefore, when steering is to be assisted in such a state that the rotation center line of the worm 71 is inclined with respect to a rotation center line during the non-press, the shaft 71a of the worm 71 can be inclined well and the rotating resistance of the worm 71 can be reduced. The shaft 71a of the worm 71 is fitted in the plain bearing 95. Therefore, even if the component of force in the radial direction to be applied to the worm 71 is applied in the axial direction, the worm 71 can be moved smoothly in the axial direction so that the rotation resistance of the worm 71 can be reduced. Since other structures and functions are the same as those in the first embodiment, the same parts have the same reference numerals and detailed description thereof and explanation of functions will be omitted.

Fifth Embodiment

Figure 13:
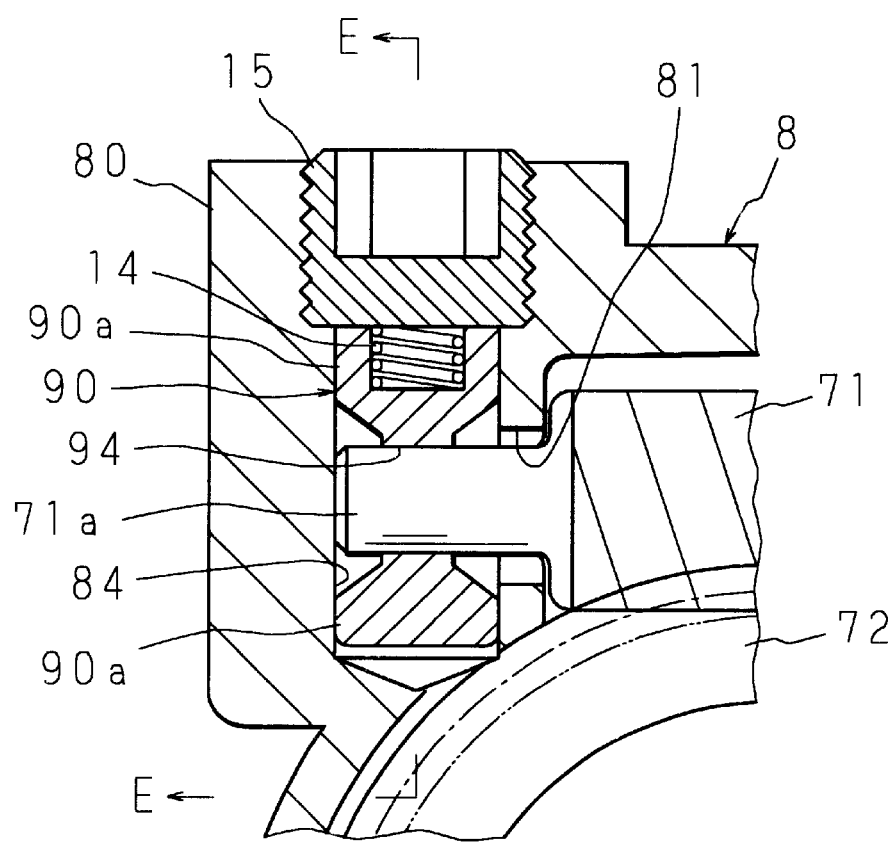
FIG. 13 is a sectional view showing a speed reducing mechanism portion according to a fifth embodiment of the electric power steering apparatus in accordance with the present invention.
Figure 14:
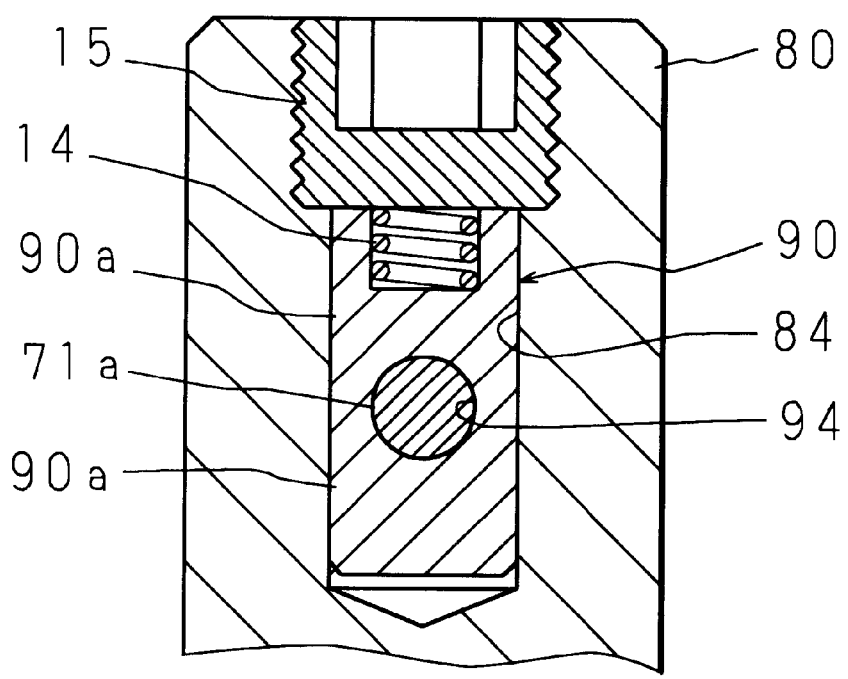
FIG. 14 is an enlarged sectional view taken along the line E—E in FIG. 13.

FIG. 13 is a sectional view showing a speed reducing mechanism portion according to a fifth embodiment and FIG. 14 is an enlarged sectional view taken along the line E–E in FIG. 13. In an electric power steering apparatus according to the fifth embodiment, a plain bearing 95 is not provided and a pressing body 90 having a fit hole 94 is wholly formed of a synthetic resin instead of causing the fit hole 94 portion of the pressing body 90 formed of a metal to be the plain bearing 95 formed of a synthetic resin.

In the fifth embodiment, the plain bearing 95 is not provided. Therefore, the number of parts can be reduced as compared with the conventional arts in which a rolling bearing or a roller is used. Consequently, a cost can be reduced. Since other structures and functions are the same as those in the first embodiment, the same parts have the same reference numerals and detailed description thereof and explanation of functions will be omitted.

Sixth Embodiment

Figure 15:
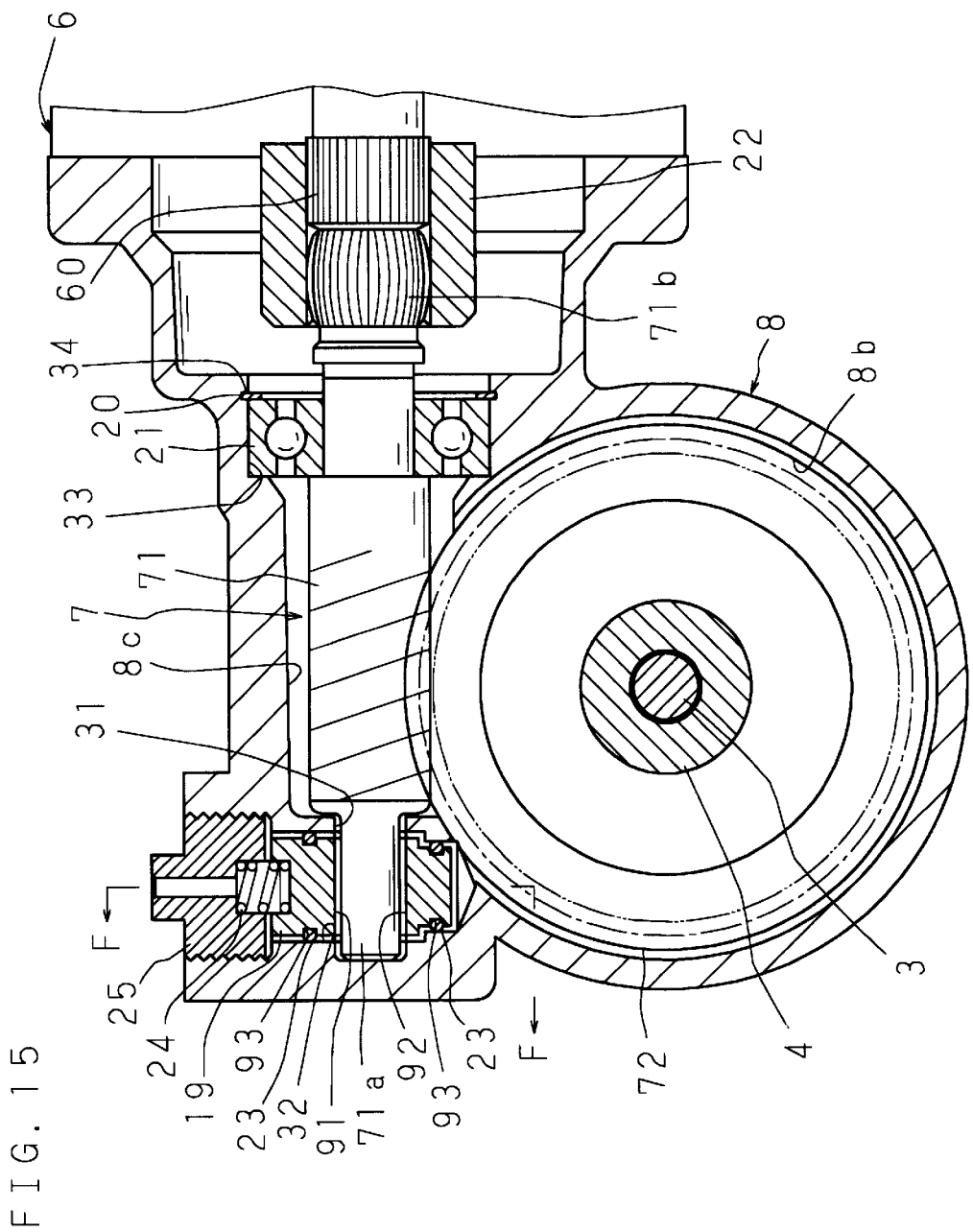
FIG. 15 is a sectional view showing a speed reducing mechanism portion according to a sixth embodiment of the electric power steering apparatus in accordance with the present invention.

FIG. 15 is a sectional view showing a speed reducing mechanism portion according to a sixth embodiment. A third accommodating portion 8c is extended in the axial direction of a worm 71, and has a supporting member 30 provided with one of ends in a longitudinal direction thereof. The supporting member 30 has a cylindrical concave hole 31 in which a shaft 71a provided on one of ends of the worm 71 is to be inserted and has a cylindrical holding hole 32 which faces the internal surface (inside) of the concave hole 31 and is provided in the radial direction of the shaft 71a. The supporting member 30 is formed integrally with a housing 8, and furthermore, may be attached to the housing 8 through attachment means such as a bolt separately from the housing 8.

The concave hole 31 is formed to have a length in an axial direction thereof greater than the inside diameter of the holding hole 32, and the holding hole 32 faces in the middle in the axial direction of the concave hole 31. Moreover, there are provided, on the other end of the third accommodating portion 8c, a fit hole 33 and an annular groove 34 successively to fit the hole 33, and a snap ring 20 is fitted in the annular groove 34.

The worm 71 is provided to cross the core of the second steering shaft 4 and has shafts 71a and 71b provided on both ends thereof. The shaft 71a on one of the ends is inserted in the concave hole 31, and furthermore, is supported rotatably through a pressing body 19 held in the holding hole 32 to be movable in an axial direction. The shaft 71b on the other end is supported rotatably on the fit hole 33 through a rolling bearing 21 and constrains the movement of the rolling bearing 21 in the axial direction through the snap ring 20 fitted in the annular groove 34. Moreover, the shaft 71b on the other end is spline fitted in the internal surface of a cylinder 22 and is coupled to an output shaft 60. The shaft 71b has a peripheral surface curved in the form of a convex with respect to a core as shown in FIG. 15 and can rock the worm 71 around the curved peripheral surface.

Figure 16:
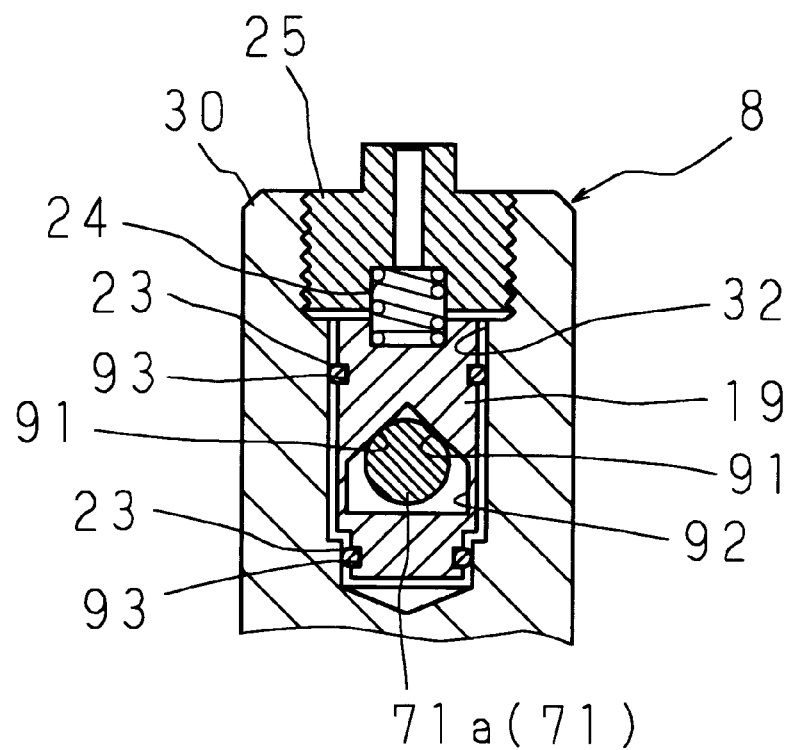
FIG. 16 is an enlarged sectional view taken along the line F—F in FIG. 15.

FIG. 16 is an enlarged sectional view taken along the line F—F in FIG. 15. The pressing body 19 is formed cylindrically of a synthetic resin material, and has a contact portion 91 abutting on the peripheral surface of the shaft 71a in an approximate middle position in the axial direction, that is, an approximate middle position in a direction of movement along the holding hole 32 (in the radial direction of the shaft 71a). Moreover, an insertion hole 92 in which the shaft 71a is to be inserted is provided, and annular elastic bodies 23 and 23 for restricting the movement of the pressing body 19 in a direction crossing the direction of movement are provided in both side positions in the direction of movement with respect to the contact portion 91. The pressing body 19 has a small diameter portion and a large diameter portion where the elastic bodies 23 and 23 are provided, and the diameter may be almost equal over the whole length and the shape thereof is not particularly restricted.

An O ring formed of synthetic rubber is used for the elastic bodies 23 and 23. The elastic bodies 23 and 23 are fitted in a pair of annular grooves 93 and 93 formed apart from each other over the peripheral surface of the pressing body 19 and the elastic bodies 23 and 23 come in contact with the internal surface of the holding hole 32, thereby limiting the movement in the direction crossing the direction of movement of the pressing body 19. The contact portion 91 is formed by an almost V-shaped slant surface to abut on at least two peripheral positions of the shaft 71a and moves the pressing body 19 in the radial direction of the shaft 71a in abutment on the shaft 71a, thereby moving the worm 71 toward the worm wheel 72.

Moreover, the pressing body 19 is energized in the direction of movement through an elastic body 24 such as a coil spring. The elastic body 24 is provided between a cover body 25 removably screwed to the open edge portion of the holding hole 32 and the pressing body 19 and serves to move the pressing body 19 by the force of the elastic body 24, to press the contact portion 91 of the pressing body 19 against the shaft 71a by comparatively small force and to energize the worm 71 toward an engagement point with the worm wheel 72. A clearance having a proper dimension is generated between the pressing body 19 energized by the elastic body 24 and the cover body 25.

Figure 17:
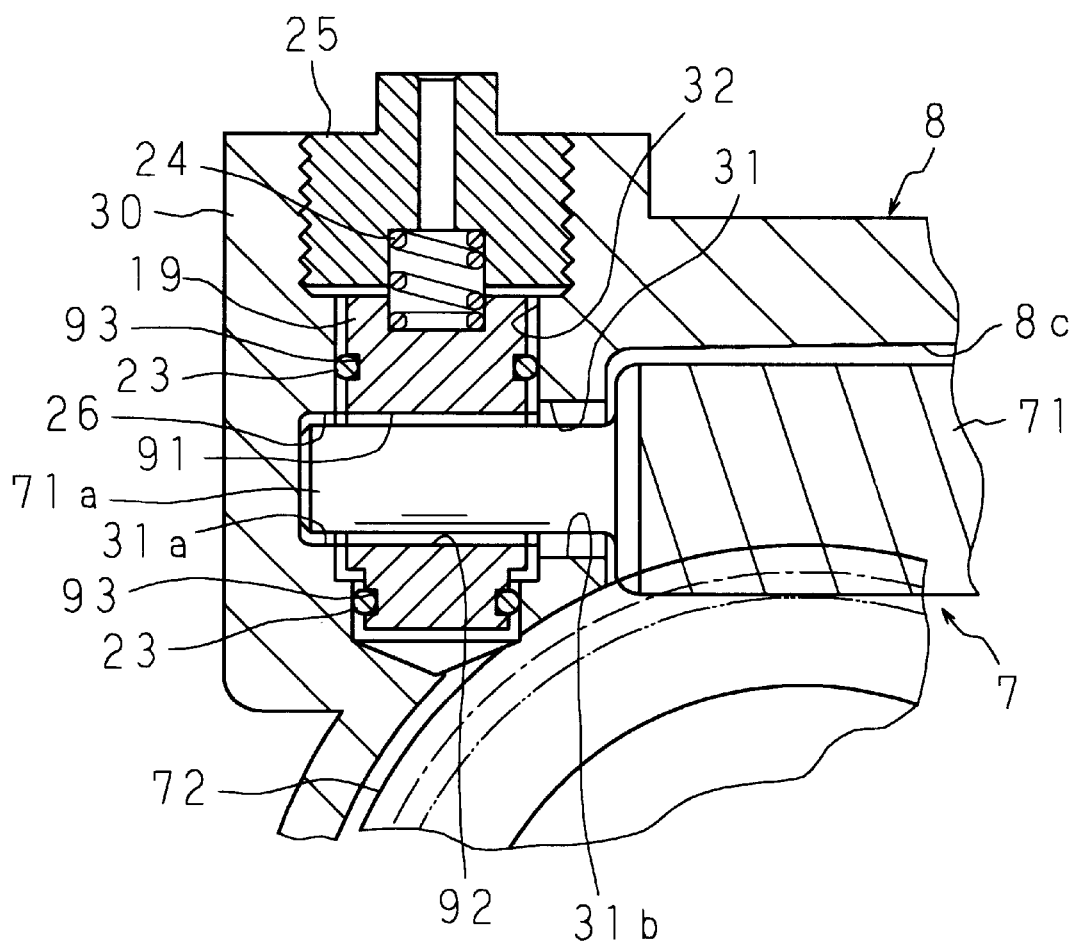
FIG. 17 is an enlarged sectional view showing the speed reducing mechanism portion according to the sixth embodiment of the electric power steering apparatus in accordance with the present invention.

FIG. 17 is an enlarged sectional view showing a speed reducing mechanism portion. A restricting member 26 (restricting means) for causing the peripheral surface of the shaft 71a to abut to restrict the movement of the worm 71 to go away with respect to the worm wheel 72 is provided in a concave hole 31 in which the shaft 71a of the worm 71 to be thus moved in the radial direction through the pressing body 19 is inserted. The restricting member 26 is formed by setting the inside diameter of a hole portion 31a on the opposite side to the third accommodating portion 8c with respect to the holding hole 32 of the concave hole 31 to be smaller than that of a hole portion 31b on the third accommodating portion 8c side with respect to the holding hole 32.

The restricting member 26 is constituted as follows. When the worm 71 is moved to go away in the radial direction with respect to the worm wheel 72 by a reverse input load, the shaft 71a abuts on the restricting member 26 before a stress equal to or greater than a permissible stress of the pressing body 19 is applied to the pressing body 19 so that the movement of the worm 71 to go away can be blocked and an excessive stress can be prevented from being applied to the pressing body 19.

Accordingly, the pressing body 19 is moved by the amount of a clearance between the pressing body 19 and the cover body 25 through the reverse input load, the shaft 71a abuts on the restricting member 26 when the pressing body 19 is flexed at a stress which is not within a permissible limit, and the movement of the worm 71 to go away is thus blocked.

In the sixth embodiment, when the worm 71 is to be incorporated, the pressing body 19 is moved through the elastic body 24 through screwing of the cover body 25 and the worm 71 is caused to come in contact with the worm wheel 72. By turning the worm wheel 72 to confirm that a backlash is not generated, the backlash amount of the engagement portion of the worm 71 and the worm wheel 72 can be eliminated.

When a steering wheel gets on a curb or the like so that the reverse input load is transmitted from the steering wheel to the engagement portion of the worm 71 and the worm wheel 72 through the second steering shaft 4 and the worm 71 is moved to go away in the radial direction with respect to the worm wheel 72 due to the reverse input load, the pressing body 19 abutting on the shaft 71a of the worm 71 is moved against the force of the elastic body 24, the pressing body 19 abuts on the cover body 25 to block the movement of the pressing body 19, the pressing body 19 formed of a synthetic resin is flexed due to the reverse input load, and the edge portion of the shaft 71a abuts on the restricting member 26 before an excessive stress is applied to the pressing body 19 so that the movement of the worm 71 to go away is blocked. Accordingly, it is possible to prevent the excessive stress from being applied to the pressing body 19, to prevent the pressing body 19 from being broken due to the reverse input load, and to prevent a rolling bearing 21 from getting on and the worm 71 from being broken. Moreover, the concave hole 31 in which the shaft 71a of the worm 71 is to be inserted is set to be the restricting member 26. Therefore, when the concave hole 31 is to be processed, the restricting member 26 can be provided together with the concave hole 31 and the work for assembling the restricting member 26 is not required.

While a clearance having a proper dimension has been generated between the pressing body 19 energized by the elastic body 24 and the cover body 25 in the sixth embodiment described above, the pressing body 19 may be caused to come in contact with the cover body 25 to eliminate the clearance. In this case, the pressing body 19 formed of a synthetic resin is flexed by the reverse input load, and the edge portion of the shaft 71a abuts on the restricting member 26 before the excessive stress is applied to the pressing body 19, thereby blocking the movement of the worm 71 to go away. While the pressing body 19 has been formed of a synthetic resin in the sixth embodiment described above, it may be formed of a metal. In this case, for example, the contact portion 91 may be formed of a synthetic resin or a spacer formed of a synthetic resin may be provided between the pressing body 19 and the cover body 25 such that the contact portion 91 or the spacer is flexed by the reverse input load to move the worm 71 to go away slightly.

Seventh Embodiment

Figure 18:
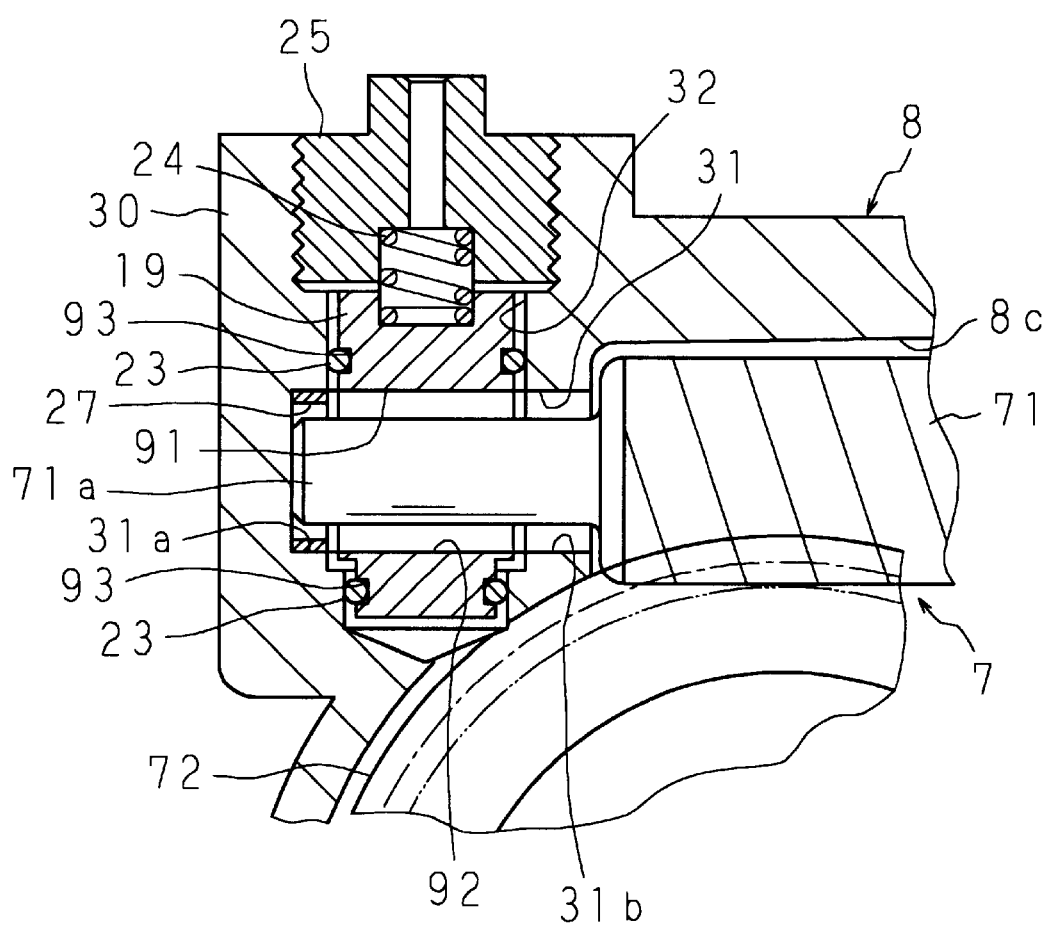
FIG. 18 is an enlarged sectional view showing a speed reducing mechanism portion according to a seventh embodiment of the electric power steering apparatus in accordance with the present invention.

FIG. 18 is an enlarged sectional view showing a speed reducing mechanism portion according to a seventh embodiment. In an electric power steering apparatus according to the seventh embodiment, a circular ring 27 having a smaller inside diameter than the inside diameter of a concave hole 31 is attached to the inner peripheral surface (inside) of the concave hole 31 and acts as restricting means instead of causing the concave hole 31 itself in which a shaft 71a of a worm 71 is to be inserted to act as the restricting means. In the seventh embodiment, the ring 27 is formed of a synthetic resin and is fixed to the third accommodating portion 3c and a hole portion 31a on the opposite side thereto with respect to a holding hole 32 of the concave hole 31 through pressing.

In the seventh embodiment, when the worm 71 is moved to go away in the radial direction with respect to the worm wheel 72 due to the reverse input load, the pressing body 19 abutting on the shaft 71a of the worm 71 is moved against the force of the elastic body 24, the pressing body 19 abuts on the cover body 25 to block the movement of the pressing body 19, the pressing body 19 is flexed due to the reverse input load, and the edge portion of the shaft 71a abuts on the ring 27 before an excessive stress is applied to the pressing body 19 so that the movement of the worm 71 to go away is blocked. Moreover, the ring 27 is fixed to the concave hole 31 having a comparatively small diameter. Therefore, restricting means can simply be provided without changing the existing supporting structure of the worm 71. Since other structures and functions are the same as those in the sixth embodiment, the same parts have the same reference numerals, and detailed description thereof and explanation of functions will be omitted.

Eighth Embodiment

Figure 19:
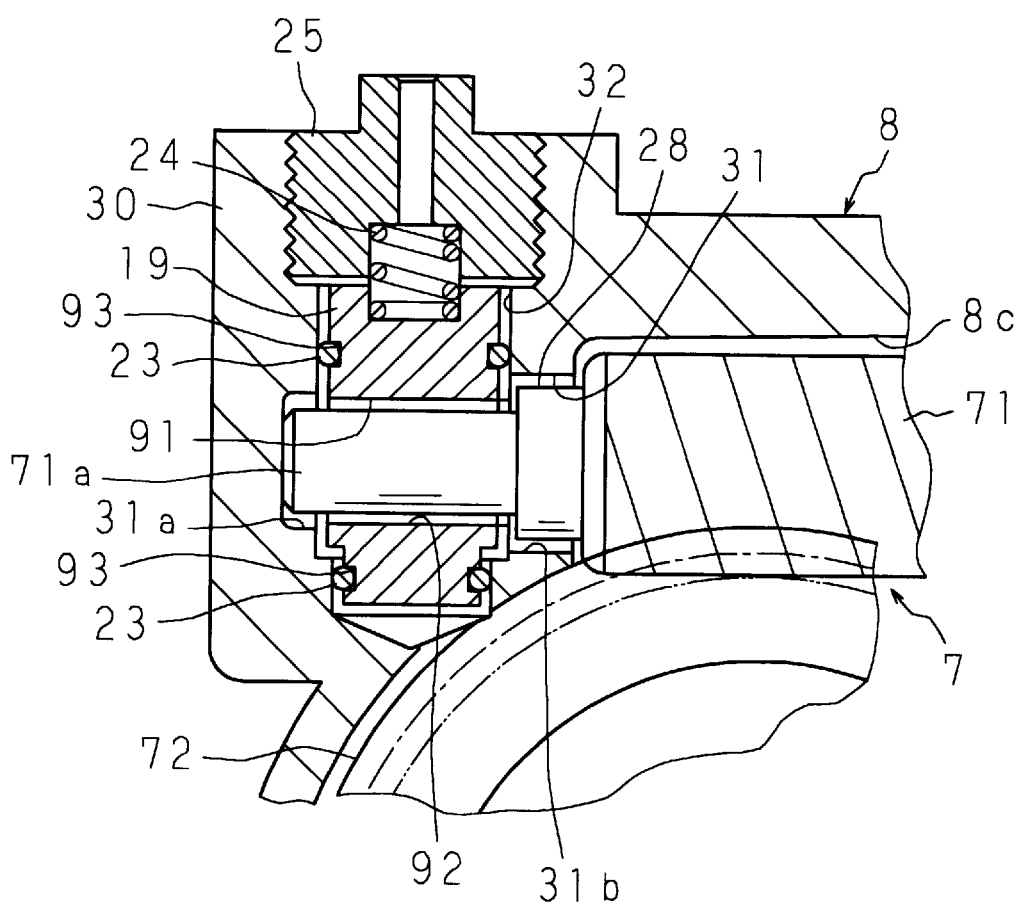
FIG. 19 is an enlarged sectional view showing a speed reducing mechanism portion according to an eighth embodiment of the electric power steering apparatus in accordance with the present invention.

FIG. 19 is an enlarged sectional view showing a speed reducing mechanism portion according to an eighth embodiment. In an electric power steering apparatus according to the eighth embodiment, a thicker-diameter portion 28 formed integrally with a shaft 71a is caused to act as restricting means instead of causing a concave hole 31 in which the shaft 71a of a worm 71 is to be inserted to act as a restricting member or fixing the ring 27 to the concave hole 31. In the eighth embodiment, the shaft 71a has a base end where the thicker-diameter portion 28 integral with the shaft 71a is formed to have a circular section, and the thicker-diameter portion 28 can abut on a hole portion 31*b* on the third accommodating portion 8*c* side with respect to a holding hole 32 of the concave hole 31.

In the eighth embodiment, when the worm 71 is moved to go away in the radial direction with respect to the worm wheel 72 due to the reverse input load, a pressing body 19 abutting on the shaft 71*a* of the worm 71 is moved against the force of an elastic body 24, the pressing body 19 abuts on a cover body 25 to block the movement of the pressing body 19, the pressing body 19 is flexed due to the reverse input load, and the thicker-diameter portion 28 of the shaft 71*a* abuts on the hole portion 31*b* on the third accommodating portion 8*c* side with respect to the holding hole 32 of the concave hole 31 before an excessive stress is applied to the pressing body 19 so that the movement of the worm 71 to go away is blocked. Moreover, when the shaft 71*a* is to be processed, the thicker-diameter portion 28 can be processed together with the shaft 71*a*. Therefore, the work for incorporating restricting means is not required. Since other structures and functions are the same as those in the sixth embodiment, the same parts have the same reference numerals, and detailed description thereof and explanation of functions will be omitted.

Ninth Embodiment

Figure 20:
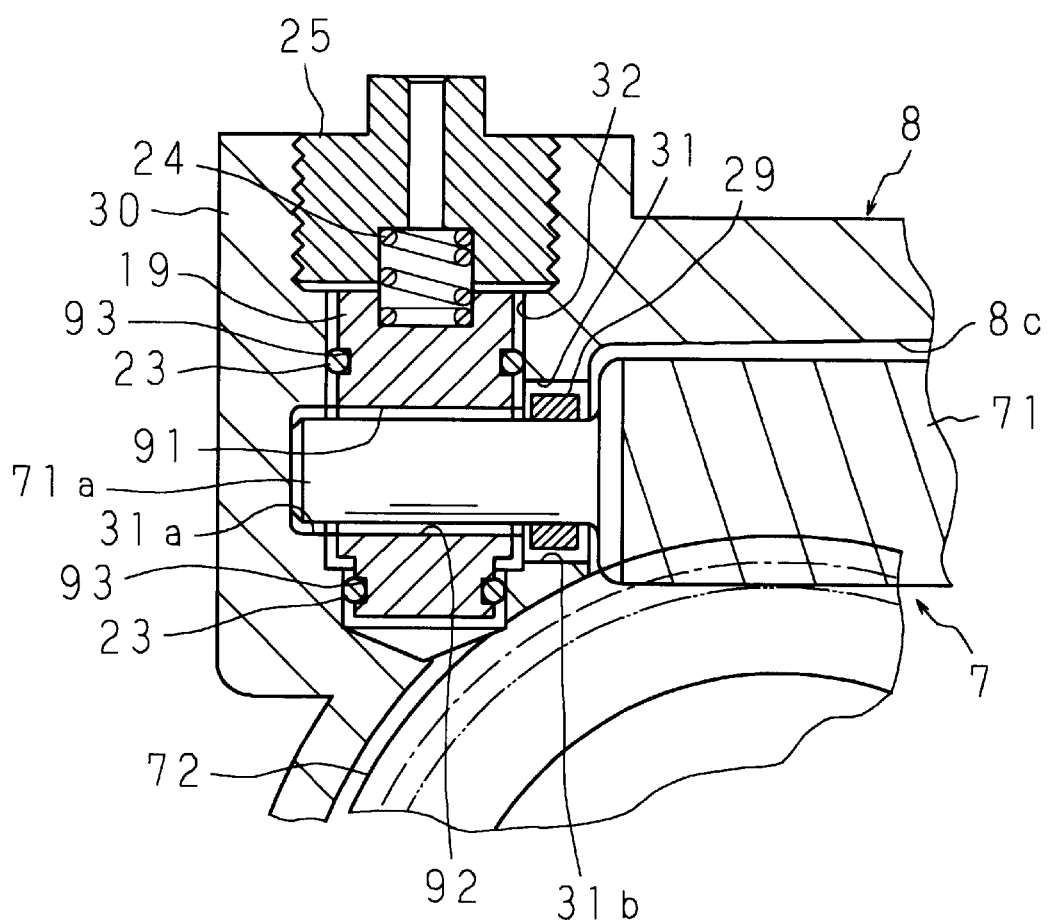
FIG. 20 is an enlarged sectional view showing a speed reducing mechanism portion according to a ninth embodiment of the electric power steering apparatus in accordance with the present invention.

FIG. 20 is an enlarged sectional view showing a speed reducing mechanism portion according to a ninth embodiment. In an electric power steering apparatus according to the ninth embodiment, a circular ring 29 having a greater outside diameter than the outside diameter of a shaft 71*a* is attached to the base end of the shaft 71*a* and acts as restricting means instead of providing the restricting means integrally with the shaft 71*a* of a worm 71. In the ninth embodiment, the ring 29 is formed of a synthetic resin and is fixed to the base end of the shaft 71*a* through pressing.

In the ninth embodiment, when the worm 71 is moved to go away in the radial direction with respect to the worm wheel 72 due to the reverse input load, a pressing body 19 abutting on the shaft 71*a* of the worm 71 is moved against the force of an elastic body 24, the pressing body 19 abuts on a cover body 25 to block the movement of the pressing body 19, the pressing body 19 is flexed due to the reverse input load, and the ring 29 of the shaft 71*a* abuts on a hold portion 31*b* on the third accommodating portion 8*c* side with respect to a holding hole 32 of a concave hole 31 before an excessive stress is applied to the pressing body 19 so that the movement of the worm 71 to go away is blocked. Moreover, the ring 29 is fixed to the shaft 71*a* having a comparatively small diameter. Therefore, restricting means can simply be provided without changing the existing supporting structure of the worm 71. Since other structures and functions are the same as those in the sixth embodiment, the same parts have the same reference numerals, and detailed description thereof and explanation of functions will be omitted.

While the restricting means has been provided on either of the shaft 71*a* and the concave hole 31 in the fifth to ninth embodiments described above, the restricting means may be divided into two portions and may be provided on both the shaft 71*a* and the concave hole 31, respectively.

Tenth Embodiment

Figure 21:
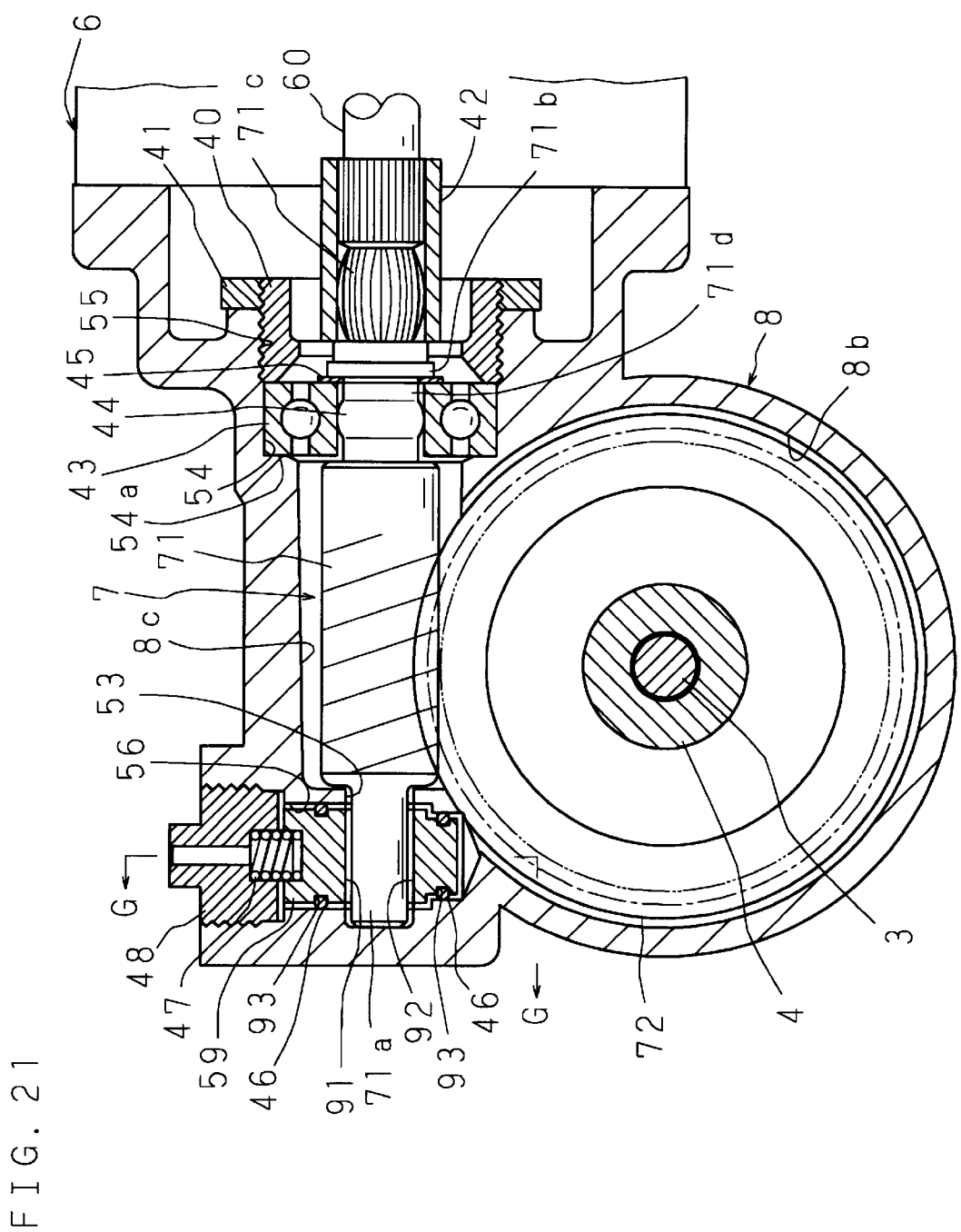
FIG. 21 is a sectional view showing a speed reducing mechanism portion according to a tenth embodiment of the electric power steering apparatus in accordance with the present invention.
Figure 22:
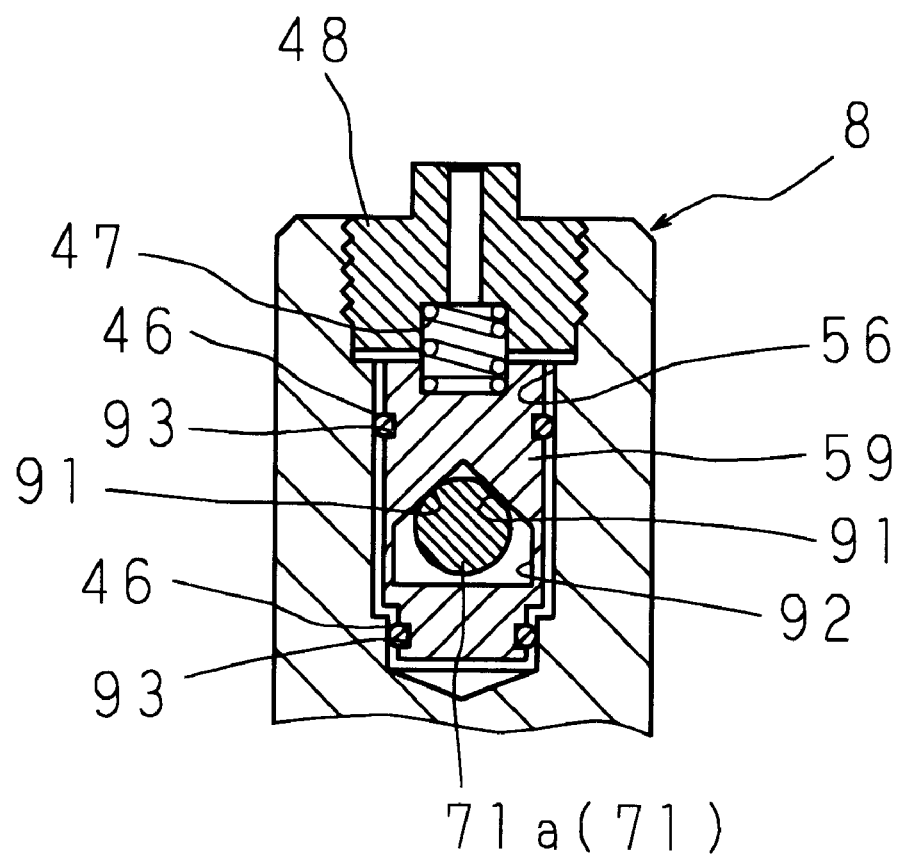
FIG. 22 is an enlarged sectional view taken along the line G—G in FIG. 21.
Figure 23:
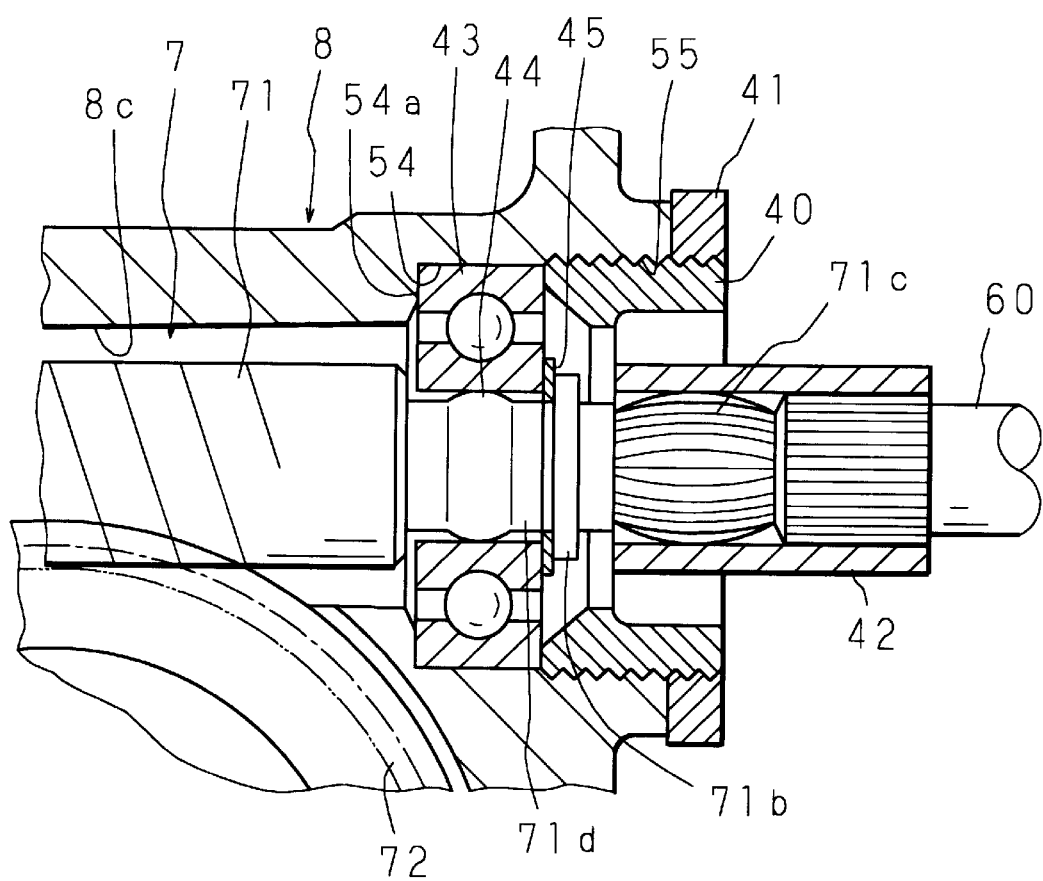
FIG. 23 is an enlarged sectional view showing a speed reducing mechanism portion according to the tenth embodiment of the electric power steering apparatus in accordance with the present invention.

FIG. 21 is a sectional view showing a speed reducing mechanism portion according to a tenth embodiment, FIG. 22 is an enlarged sectional view taken along the line G—G in FIG. 21, and FIG. 23 is an enlarged sectional view showing a speed reducing mechanism portion. The third accommodating portion 8*c* is extended in the axial direction of a worm 71 and has one of ends in a longitudinal direction thereof provided with a concave hole 53 in which a shaft 71*a* formed on one of ends of the worm 71 is to be inserted. There are provided, on the other end of the third accommodating portion 8*c*, a fit portion 54 having an annular step portion 54a and a screw hole 55 successively to the fit portion 54, a screw ring 40 for adjusting a position in the axial direction of the worm 71 is screwed to the screw hole 55, and a lock nut 41 is screwed to the screw ring 40. Moreover, a housing 8 is provided with a guide hole 56 facing the internal surface of the concave hole 53 on one end side of the third accommodating portion 8*c* and formed in the radial direction of the shaft 71*a*.

The worm 71 is provided to cross the core of the second steering shaft 4 and has both ends provided with shafts 71*a* and 71*b*. The shaft 71*b* provided on the other end has a coupling portion 71*c* connected to an output shaft 60 through a cylinder 42 and a fit portion 71*d* in which the inner ring of a bearing 43 using a rolling bearing is fitted. A convex 44 for permitting the rocking operation of the worm 71 is provided over the whole periphery of the fit portion 71*d*. The convex 44 is formed to have a sectional shape in an axial direction which is arcuate around a core and can rock the worm 71 around the convex 44 with respect to the bearing 43. Moreover, a regulating ring 45 such as a C ring for regulating the movement in the axial direction of the worm 71 is removably attached to a ring concave portion between the convex 44 and the coupling portion 71*c* opposite to one of the ends of the inner ring of the bearing 43.

The coupling portion 71*c* has a peripheral surface curved like a convex with respect to the core as shown in FIG. 21 and the curved peripheral surface is spline fitted on the internal surface of the cylinder 42 so that the worm 71 can be rocked around the convex 44. The coupling portion 71*c* may be coupled to an output shaft 60 by using the cylinder 42 or a coupling such as a constant velocity joint.

The shaft 71*a* provided on one of the ends is inserted into the concave hole 53, and furthermore, is rotatably supported on a pressing body 59 accommodated in a guide hole 56 movably in an axial direction. The pressing body 59 is formed cylindrically of a synthetic resin material, and has a contact portion 91 abutting on the peripheral surface of the shaft 71*a* in an approximate middle position in the axial direction, that is, an approximate middle position in a direction of movement along the guide hole 56 (in the radial direction of the shaft 71*a*). Moreover, an insertion hole 92 in which the shaft 71*a* is to be inserted is provided, and annular elastic bodies 46 and 46 for restricting the movement of the pressing body 59 in a direction crossing the direction of movement are provided in both side positions in the direction of movement with respect to the contact portion 91. The pressing body 59 has a small diameter portion and a large diameter portion where the elastic bodies 46 and 46 are provided, and the diameter may be almost equal over the whole length and the shape thereof is not particularly restricted.

An O ring formed of synthetic rubber is used for the elastic bodies 46 and 46. The elastic bodies 46 and 46 are fitted in a pair of annular grooves 93 and 93 formed apart from each other over the peripheral surface of the pressing body 59 and the elastic bodies 46 and 46 come in contact with the internal surface of the guide hole 56, thereby limiting the movement in the direction crossing the direction of movement of the pressing body 59. The contact portion 91 is formed by an almost V-shaped slant surface to abut on at least two peripheral positions of the shaft 71*a* and moves the pressing body 59 in the radial direction of the shaft 71*a* in abutment on the shaft 71*a*, thereby pressing the worm 71 toward the worm wheel 72. Moreover, the pressing body 59 is energized in the direction of movement through energizing means 47. The energizing means 47 is formed of an elastic body such as a coil spring and is provided between an adjusting screw 48 screwed into the open edge portion of the guide hole 56 and the pressing body 59, and serves to press the contact portion 91 of the pressing body 59 by the comparatively small force of the energizing means 47 toward the shaft 71a, thereby energizing the worm 71 to an engagement point with the worm wheel 72.

In the electric power steering apparatus having the above-mentioned structure, in the case in which the worm 71 is to be incorporated, the worm 71 is inserted from the fit portion 54 into the third accommodating portion 8c, the shaft 71a on one of the ends of the worm 71 is inserted from the concave hole 53 into the insertion hole 92 of the pressing body 59, and a peripheral surface thereof is supported on the contact portion 91, and furthermore, the outer ring of the bearing 43 is fitted in the fit portion 54, the inner ring of the bearing 43 is fitted in the convex 44 of the shaft 71b provided on the other end and the screw ring 40 is screwed to the screw hole 55.

The rotating operation force of the screw ring 40 is applied to the step portion 54a of the housing 8 through the outer ring of the bearing 43, the bearing 43 is fixed to the housing 8, and a clearance in an axial direction for permitting the rocking operation of the worm 71 is generated between the inner ring of the bearing 43 and the tooth portion of the worm 71. Moreover, the pressing body 59 is moved through the operation of the adjusting screw 48 and the shaft 71a abutting on the contact portion 91 of the pressing body 59 is moved in the radial direction so that the backlash amount of the engagement portion of the worm 71 and the worm wheel 72 is regulated. At this time, the worm 71 is rocked by using the convex 44 as a fulcrum. Therefore, the worm 71 can be rocked at a rocking angle which is equal to or greater than a corner clearance of the bearing 43. Thus, the regulation margin of the backlash amount can be increased.

Moreover, in the case in which a reverse input load is transmitted to the worm 71, the worm 71 can be moved to go away from the worm wheel 72 at a rocking angle which is equal to or greater than the corner clearance of the bearing 43 by using the convex 44 as a fulcrum against the force of the energizing means 47. Therefore, it is possible to prevent the bearing 43 from being broken due to the reverse input load. Furthermore, the pressing body 59 is energized by the energizing means 47. Therefore, even if the teeth of the worm 71 and the worm wheel 72 are worn, the backlash amount can be reduced well.

Eleventh Embodiment

Figure 24:
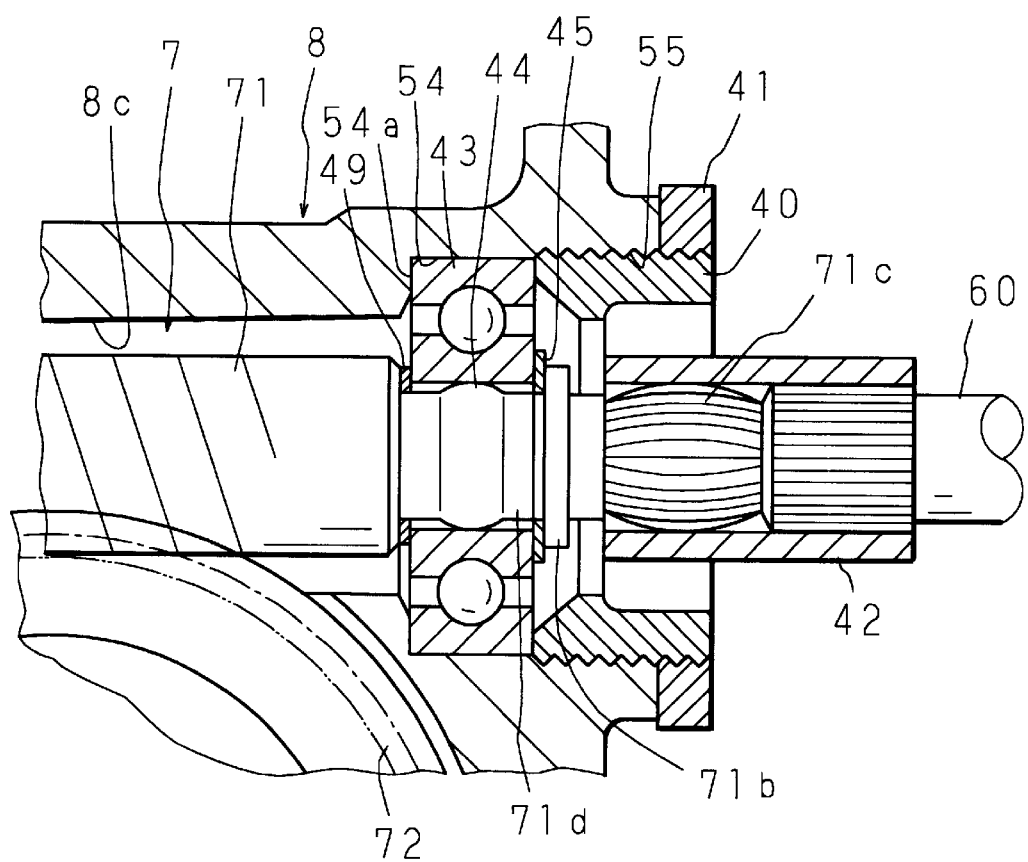
FIG. 24 is an enlarged sectional view showing a speed reducing mechanism portion according to an eleventh embodiment of the electric power steering apparatus in accordance with the present invention.

FIG. 24 is an enlarged sectional view showing a speed reducing mechanism portion according to an eleventh embodiment. In an electric power steering apparatus according to the eleventh embodiment, an annular elastic body 49 formed of synthetic rubber for permitting the rocking operation of a worm 71 is provided in a clearance generated between the inner ring of a bearing 43 and the tooth portion of the worm 71 according to the tenth embodiment.

In the eleventh embodiment, the clearance in the axial direction of the worm 71 can be absorbed through the elastic body 49. Therefore, an unevenness in the axial direction of the worm 71 can be eliminated well. Since other structures and functions are the same as those in the tenth embodiment, the same parts have the same reference numerals, and detailed description thereof and explanation of functions will be omitted.

Twelfth Embodiment

Figure 25:
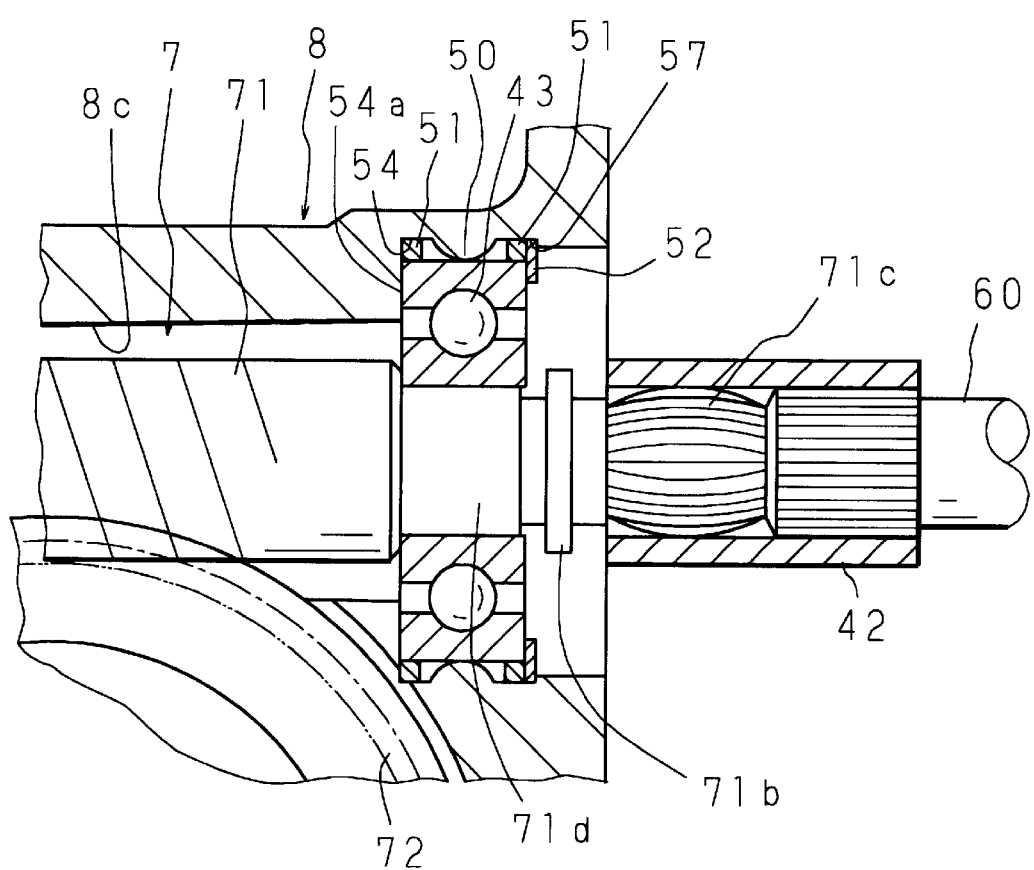
FIG. 25 is a sectional view showing a speed reducing mechanism portion according to a twelfth embodiment of the electric power steering apparatus in accordance with the present invention.

FIG. 25 is an enlarged sectional view showing a speed reducing mechanism portion according to a twelfth embodiment. In an electric power steering apparatus according to the twelfth embodiment, a convex 50 for permitting the rocking operation of a worm 71 is provided over the whole periphery in a fit portion 54 of a housing 8 instead of providing the convex 44 in the fit portion 71d of the shaft 71b, and the screw hole 55, the screw ring 40 and the lock nut 41 are not provided. The convex 50 is formed to have an arcuate sectional shape in an axial direction, and the worm 71 can be rocked with respect to the housing 8 through a bearing 43 using a rolling bearing.

An annular elastic body 51 formed of synthetic rubber for elastically holding the outer ring of the bearing 43 is provided on both end sides of the convex 50 so that the bearing 43 has a high stability for the fit portion 54. Moreover, an annular groove 57 is provided in a position opposite to a concave hole 53 of the fit portion 54, and a regulation ring 52 such as a C ring opposed to one of ends of the outer ring of the bearing 43 and serving to regulate the movement in an axial direction of the bearing 43 is removably fixed to the annular groove 57. Since other structures and functions are the same as those in the tenth embodiment, the same parts have the same reference numerals, and detailed description thereof and explanation of functions will be omitted.

While the convex 44 has been provided in the fit portion 71d of the shaft 71b to be the inner peripheral side portion of the bearing 43 in the tenth and eleventh embodiments described above, a convex may be provided on the inner peripheral surface of the bearing 43. While the convex 50 has been provided in the fit portion 54 of the housing 8 to be the outer peripheral side portion of the bearing 43 in the twelfth embodiment, moreover, a convex may be provided on the outer peripheral surface of the bearing 43. Furthermore, the convexes 44 and 50 may be provided on either or both of the inner peripheral side portion and the outer peripheral side portion in the bearing 43. In addition, the convexes 44 and 50 may be attached integrally with the shaft 71b or the housing 8 or separately therefrom through attachment means such as press.

While the worm 71 has had the cylindrical pressing bodies 19 and 59 as the pressing means for pressing the worm 71 toward the worm wheel 72 in the fifth to twelfth embodiments described above, an elastic ring having a deflecting hole may be provided around the shaft 71a or an elastic body such as a spring for energizing the shaft 71a in a radial direction may be provided and the structure is not particularly restricted.

The speed reducing mechanism 7 according to each of the embodiments described above may be a worm gear comprising a driving gear 71 to be a worm and a driven gear 72 to be a worm wheel or a hypoid gear comprising a driving gear to be a hypoid pinion and a driven gear to be a hypoid wheel. Furthermore, the speed reducing mechanism may be a bevel gear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:
   a driving gear interlocking with a source of a rotational force for steering assistance and having first and second ends, a first shaft at its first end and a second shaft at its second end;
   a driven gear engaged with said driving gear and connected to a steering mechanism;
   a pressing body pressing said driving gear toward said driven gear by urging said first shaft in a direction crosswise to its length; and
   a guide member provided with a guide hole for guiding movement of said pressing body, the guide member constructed to guide said pressing body for movement crosswise to the length of the first shaft while preventing movement thereof in the direction of the length of the first shaft;
   said first shaft being supported by said guide member through said pressing body; and
   a rolling bearing in a fixed relationship to the guide member positioned to support the second shaft.

2. The electric power steering apparatus according to claim 1, wherein said pressing body has a fit hole portion and a plain bearing for permitting a slippage in an axial direction of said first shaft is provided in said fit hole portion.

3. The electric power steering apparatus according to claim 1, wherein a clearance for permitting an inclination of said first shaft with respect to a center of said fit hole is provided between said fit hole and said first shaft.

4. The electric power steering apparatus according to claim 2, wherein a clearance for permitting an inclination of said first shaft with respect to a center of said fit hole is provided between said fit hole and said first shaft.

* * * * *